US008830530B2

(12) United States Patent
Sano et al.

(10) Patent No.: US 8,830,530 B2
(45) Date of Patent: Sep. 9, 2014

(54) IMAGE PROCESSOR AND IMAGE PROCESSING METHOD GENERATING FIRST AND SECOND MULTI-VALUE DENSITY DATA OR PERFORMING QUANTIZATION BASED ON AN IMAGE CHARACTERISTIC

(75) Inventors: Ayumi Sano, Kawasaki (JP); Fumihiro Goto, Kawasaki (JP); Akitoshi Yamada, Yokohama (JP); Akihiko Nakatani, Kawasaki (JP); Mitsuhiro Ono, Tokyo (JP); Fumitaka Goto, Tokyo (JP); Okinori Tsuchiya, Yokohama (JP); Takashi Fujita, Kawasaki (JP); Rie Kajihara, Minoo (JP); Tomokazu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 999 days.

(21) Appl. No.: 12/896,539

(22) Filed: Oct. 1, 2010

(65) Prior Publication Data
US 2011/0085189 A1    Apr. 14, 2011

(30) Foreign Application Priority Data

Oct. 14, 2009    (JP) .................................. 2009-237409

(51) Int. Cl.
*H04N 1/40*    (2006.01)
*H04N 1/191*    (2006.01)
*G06K 15/10*    (2006.01)

(52) U.S. Cl.
CPC ............ *H04N 1/1911* (2013.01); *G06K 15/107* (2013.01); *H04N 2201/0082* (2013.01); *H04N 1/1913* (2013.01)
USPC ......... 358/3.01; 358/3.02; 358/3.03; 358/1.9; 347/20; 347/66

(58) Field of Classification Search
USPC .................................................. 358/501–598
See application file for complete search history.

(56) References Cited

U.S. PATENT DOCUMENTS 6,504,494 B1 *    1/2003  Dyas et al. ...................... 341/50
6,511,143 B1     1/2003  Ishikawa
(Continued)

FOREIGN PATENT DOCUMENTS

| JP | 05-003542 | 8/1993 |
|----|-----------|--------|
| JP | 2000-103088 | 4/2000 |

(Continued)

OTHER PUBLICATIONS

U.S. Appl. No. 12/962,044, filed Dec. 7, 2010.
U.S. Appl. No. 12/896,523, filed Oct. 1, 2010.
U.S. Appl. No. 12/942,718, filed Nov. 9, 2010.
U.S. Appl. No. 12/952,819, filed Nov. 23, 2010.

*Primary Examiner* — Benny Q Tieu
*Assistant Examiner* — Michael Y Tzeng
(74) *Attorney, Agent, or Firm* — Fitzpatrick, Cella, Harper & Scinto

(57) ABSTRACT

Provided is an image processor and image processing method that are capable of suppressing both density unevenness and graininess that occur due to deviation of the printing position of dots that are printed by a plurality of relative movements (or a plurality of printing element groups). In order to accomplish this, the dot overlap rate of an image characteristic in which density unevenness stands out is made higher than the dot overlap rate of an image characteristic in which other defects stand out more than the density unevenness. By doing so, it is possible to suitably adjust the dot overlap rate according to an image characteristic, and to output an image having no density unevenness or graininess.

12 Claims, 20 Drawing Sheets

(56) References Cited

U.S. PATENT DOCUMENTS

| | | |
|---|---|---|
| 7,099,046 B2 | 8/2006 | Yamada |
| 7,312,901 B2 | 12/2007 | Yamada |
| 7,548,346 B2 | 6/2009 | Yamada |
| 7,672,011 B2 | 3/2010 | Kato |
| 7,855,809 B2 | 12/2010 | Kato |
| 7,859,723 B2 | 12/2010 | Yamada |
| 2007/0297649 A1 | 12/2007 | Nakanishi |
| 2009/0161131 A1* | 6/2009 | Fujimoto et al. ............... 358/1.9 |

FOREIGN PATENT DOCUMENTS

| | | |
|---|---|---|
| JP | 2005-173932 | 6/2005 |
| JP | 2005-063307 | 10/2005 |
| JP | 2008-162151 | 7/2008 |

\* cited by examiner

FIG.4A – FIG.4G

FIG.4A
FIRST PLANE:
| 1 | 0 | 1 |
| 0 | 1 | 0 |
| 0 | 0 | 1 |

SECOND PLANE:
| 0 | 0 | 1 |
| 1 | 0 | 0 |
| 0 | 1 | 1 |

FIG.4B
FIRST PLANE:
| 1 | 0 | 1 |
| 0 | 1 | 0 |
| 0 | 0 | 1 |

SECOND PLANE:
| 0 | 0 | 1 |
| 1 | 1 | 0 |
| 0 | 0 | 1 |

FIG.4C
FIRST PLANE:
| 1 | 0 | 1 |
| 0 | 1 | 0 |
| 0 | 0 | 1 |

SECOND PLANE:
| 0 | 0 | 1 |
| 1 | 1 | 0 |
| 0 | 0 | 1 |

FIG.4D
FIRST PLANE:
| 1 | 0 | 1 |
| 0 | 1 | 0 |
| 0 | 1 | 0 |

SECOND PLANE:
| 1 | 0 | 1 |
| 0 | 1 | 0 |
| 0 | 0 | 1 |

FIG.4E
FIRST PLANE:
| 1 | 0 | 1 |
| 0 | 1 | 0 |
| 0 | 1 | 0 |

SECOND PLANE:
| 1 | 0 | 1 |
| 0 | 1 | 0 |
| 0 | 1 | 0 |

FIG.4F
FIRST PLANE:
| 1 | 0 | 1 |
| 0 | 1 | 0 |
| 0 | 0 | 0 |

SECOND PLANE:
| 0 | 0 | 1 |
| 0 | 1 | 0 |
| 0 | 1 | 0 |

FIG.4G
FIRST PLANE:
| 1 | 0 | 1 |
| 0 | 0 | 0 |
| 0 | 0 | 0 |

SECOND PLANE:
| 0 | 0 | 0 |
| 0 | 1 | 0 |
| 0 | 0 | 1 |

FIG.4H

| | TOTAL NUMBER OF DOTS | NUMBER OF OVERLAPPING DOTS | DOT OVERLAP RATE (%) |
|---|---|---|---|
| (A) | 8 | 0 | 0 (=0÷8×100) |
| (B) | 8 | 2 | 25 (=2÷8×100) |
| (C) | 8 | 4 | 50 (=4÷8×100) |
| (D) | 8 | 6 | 75 (=6÷8×100) |
| (E) | 8 | 8 | 100 (=8÷8×100) |
| (F) | 7 | 6 | 86 (=6÷7×100) |
| (G) | 6 | 2 | 33 (=2÷6×100) |

DIFFUSION MATRIX A

|   | ● | 9 | 3 |
|---|---|---|---|
| 5 | 9 | 3 |   |
|   | 3 |   |   |

●PIXEL TO BE PROCESSED

FIG.9A

DIFFUSION MATRIX B

|   |   | ● | 2 | 1 |
|---|---|---|---|---|
| 1 | 1 | 2 | 1 |   |

●PIXEL TO BE PROCESSED

FIG.9B

IMAGE PROCESSOR AND IMAGE PROCESSING METHOD GENERATING FIRST AND SECOND MULTI-VALUE DENSITY DATA OR PERFORMING QUANTIZATION BASED ON AN IMAGE CHARACTERISTIC

BACKGROUND OF THE INVENTION

1. Field of the Invention

The present invention relates to an image processor and image processing method that process multi-value image data that corresponds to the same area in order to print an image in the same area by relatively moving a printing unit a plurality of times or by relatively moving a plurality of printing element groups with respect to the same area of a printing medium.

2. Description of the Related Art

In inkjet printing devices, a multipass printing method that completes an image in the same area of a printing medium by performing a plurality of printing scans by a printing head over that same area is known as a technique for reducing density unevenness and stripes in the printed image. However, recently, even by adopting the multipass printing method, deviation of the dot printing position may occur between that of a prior printing scan and that of a later printing scan due to fluctuation in the amount the printing medium is conveyed. This kind of deviation causes fluctuation in the dot coverage rate, which causes defects in the image such as density fluctuation and density unevenness.

A method is known as a technique for reducing these kinds of image defects, in which image data is divided into divisions that correspond to different printing scans in the stage of multi-value image data before binarization, and then binarizing each of the multi-value image data independently (with no correlation) after division (see Japanese Patent Laid-Open No. 2000-103088). FIG. 10A is a diagram that illustrates the dot arrangement state of dots that are printed based on image data that were processed by the method disclosed in Japanese Patent Laid-Open No. 2000-103088. In FIG. 10A, the black dots 1501 are dots that are printed in a first printing scan, the white dots 1502 are dots that are printed in a second printing scan, and the gray dots 1503 are overlapping dots that are printed in the first printing scan and second printing scan.

With this kind of dot arrangement, even though the dot group that is printed in the first printing scan and the dot group that is printed in the second printing scan shift in the main scanning direction or sub scanning direction, the dot coverage rate with respect to the printing medium does not fluctuate much. The reason for that is that areas where dots that are printed in the first printing scan and dots that are printed in the second printing scan overlap newly appear, however; there are also areas that exist where two dots that originally were to be printed such that they overlap no longer overlap.

However, in the method disclosed in Japanese Patent Laid-Open No. 2000-103088, binary data are not correlated among a plurality of planes, so graininess may become worse. For example, from the aspect of reducing graininess, the ideal in highlighted areas would be to evenly disperse the dots while maintaining a set distance between a few dots. However, in a configuration in which binary data are not correlated among a plurality of planes, the locations of overlapping dots (1603) and locations of dots printed adjacent to each other (1601, 1602) occur irregularly as illustrated in FIG. 10C, and an accumulation of these dots cause the graininess to become worse. In other words, when the dispersion of the dots is increased in order to suppress graininess (keep the dot overlap rate low), unevenness occurs as the density changes, and when the dot overlap rate is increased in order to suppress the unevenness due to this density change, the graininess becomes worse.

Therefore, the inventors diligently studied a method for solving both of these two problems at the same time, and as a result gained the following knowledge. In other words, both the density change and graininess described above have a certain allowable range (a range in which they are hardly noticeable by human perception). Therefore, by controlling the dot overlap rate by keeping both within the respective allowable range, output of an image in which defects do not stand out can be expected. More specifically, the allowable ranges described above change depending on the type of image, for example, whether the image is text or a photograph, and even in the case of a photograph, the ranges change depending on whether the photograph is a portrait or scenery; and the suitable dot overlap rate differs depending on the image characteristic. Therefore, preferably the dot overlap rate is flexibly adjusted according to the image characteristic.

SUMMARY OF THE INVENTION

Taking into consideration the knowledge described above, the object of the present invention is to suppress both unevenness due to changes in density (unevenness due to density fluctuation) and graininess.

The first aspect of the present invention is n image processor for processing input image data that corresponds to a pixel area on a printing medium in order to print in that pixel area by a plurality of relative movements between a printing unit that prints dots and the printing medium, comprising: a generation unit configured to perform a generation process for generating from the input image data a plurality of density data that correspond to the plurality of relative movements; and a quantization unit configured to perform a quantization process on each of the plurality of density data, wherein at least one of the generation process and the quantization process is performed so that the ratio of the number of dots that are to overlap and be printed in the same position in a pixel area by the plurality of relative movements with respect to the total number of dots to be printed in a pixel area by the plurality of relative movements differs according to an image characteristic of the input image data.

The second aspect of the present invention is an image processor for processing input image data that corresponds to a pixel area on a printing medium in order to print in that pixel area by a plurality of relative movements between a plurality of printing element groups that print dots of the same color and the printing medium, comprising: a generation unit configured to perform a generation process for generating from the input image data a plurality of density data that corresponds to the plurality of printing element groups; and a quantization unit configured to perform a quantization process on each of the plurality of density data, wherein at least one of the generation process and the quantization process is performed so that the ratio of the number of dots that are to overlap and be printed in the same position in a pixel area by the plurality of printing element groups with respect to the total number of dots to be printed in a pixel area by the plurality of printing element groups differs according to an image characteristic of the input image data.

The third aspect of the present invention is an image processing method for processing input image data that corresponds to a pixel area on a printing medium in order to print in that pixel area by a plurality of relative movements between a printing unit that prints dots and the printing medium, comprising step of: performing a generation process for generating from the input image data a plurality of density data that corresponds to the plurality of relative movements; and performing a quantization process on each of the plurality of density data, wherein at least one of the generation process and the quantization process is performed so that the ratio of the number of dots that are to overlap and be printed in the same position in a pixel area by the plurality of relative movements with respect to the total number of dots to be printed in a pixel area by the plurality of relative movements differs according to an image characteristic of the input image data.

The fourth aspect of the present invention is an image processing for processing input image data that corresponds to a pixel area on a printing medium in order to print in that pixel area by a plurality of relative movements between a plurality of printing element groups that prints dots of the same color and the printing medium, comprising steps of: performing a generation process for generating from the input image data a plurality of density data that corresponds to the plurality of printing element groups; and performing a quantization process on each of the plurality of density data, wherein at least one of the generation process and the quantization process is performed so that the ratio of the number of dots that are to overlap and be printed in the same position in a pixel area by the plurality of printing element groups with respect to the total number of dots to be printed in a pixel area by the plurality of printing element groups differs according to an image characteristic of the input image data.

Further features of the present invention will become apparent from the following description of exemplary embodiments (with reference to the attached drawings).

BRIEF DESCRIPTION OF THE DRAWINGS

FIGS. 4A to 4H are diagrams for explaining the dot overlap rate;

FIGS. 9A and 9B are diagrams that illustrate an example of an error-diffusion matrix that is used in quantization processing;

DESCRIPTION OF THE EMBODIMENTS

The embodiments explained below use an inkjet printer as an example, however; the present invention is not limited to an inkjet printer. As long as the device is a printing unit for printing dots and prints an image on a printing medium during relative movement between the printing unit and printing medium, the invention can be applied to a device other than an inkjet printer.

The "relative movement (or relative scanning)" between the printing unit and the printing medium is an operation moving (scanning) the printing unit relative to the printing medium, or an operation of moving (conveying) the printing medium relative to the printing unit. The printing unit is one or more printing element group (nozzle array), or one or more printing head.

Figure 7:
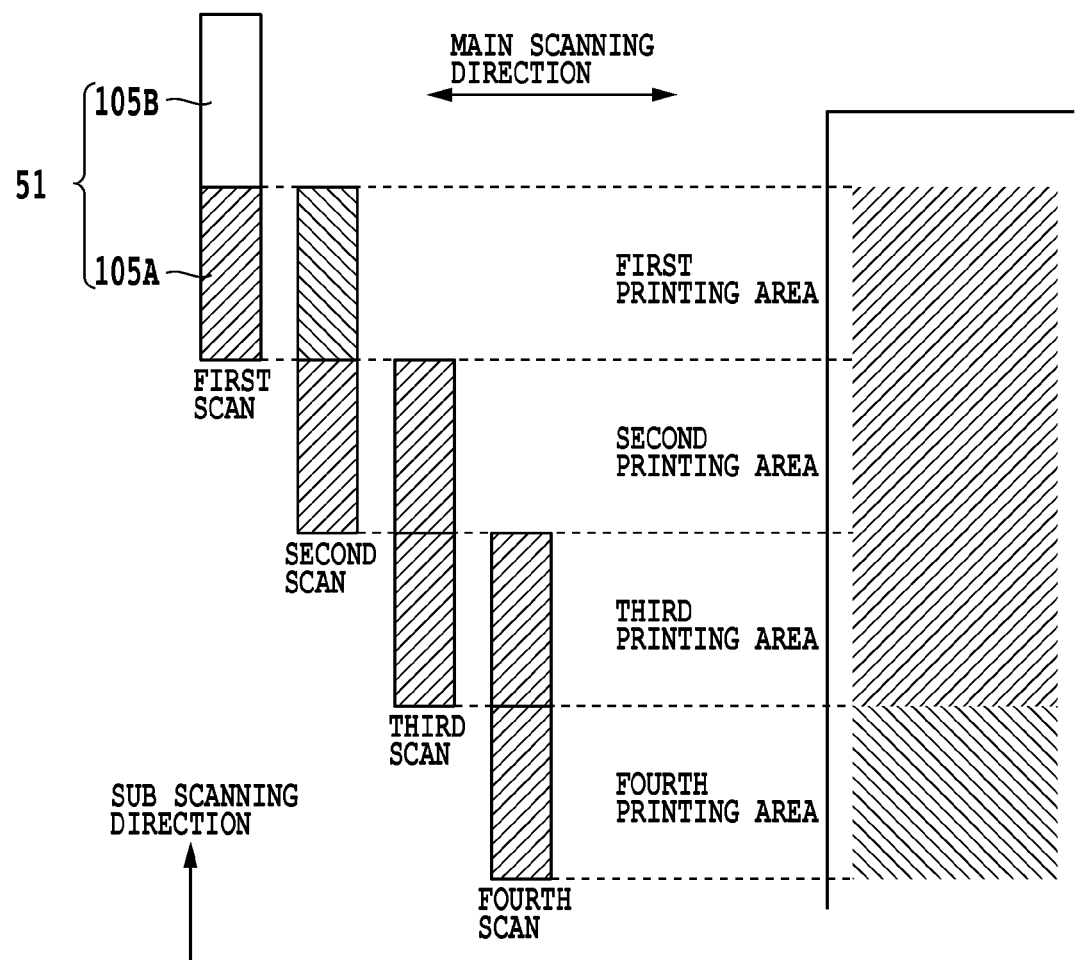
FIG. 7 is a diagram illustrating the state of 2-pass multipass printing.

In the image processor explained below, data processing is performed in order to print an image in the same area on a printing medium (specified area) by relatively moving a printing unit a plurality of times or relatively moving a plurality of printing element groups with respect to the same area of the printing medium. Here, the "same area (specified area)" is "one pixel area" on a micro scale, and "printable area by one relative movement" on a macro scale. A "pixel area (sometimes simply referred to as a "pixel")" is the smallest unit of area for which gradation expression is possible using multi-value image data. On the other hand, the "printable area by one relative movement" is an area on the printing medium over which the printing unit passes during one relative movement, or is an area smaller than this area (for example, one raster area). For example, in the case of executing a multipass mode such as illustrated in FIG. 7, on a macro scale it is also possible to define one printing area in the figure as the same area.

<Basic Explanation of the Printer>

Figure 1A:
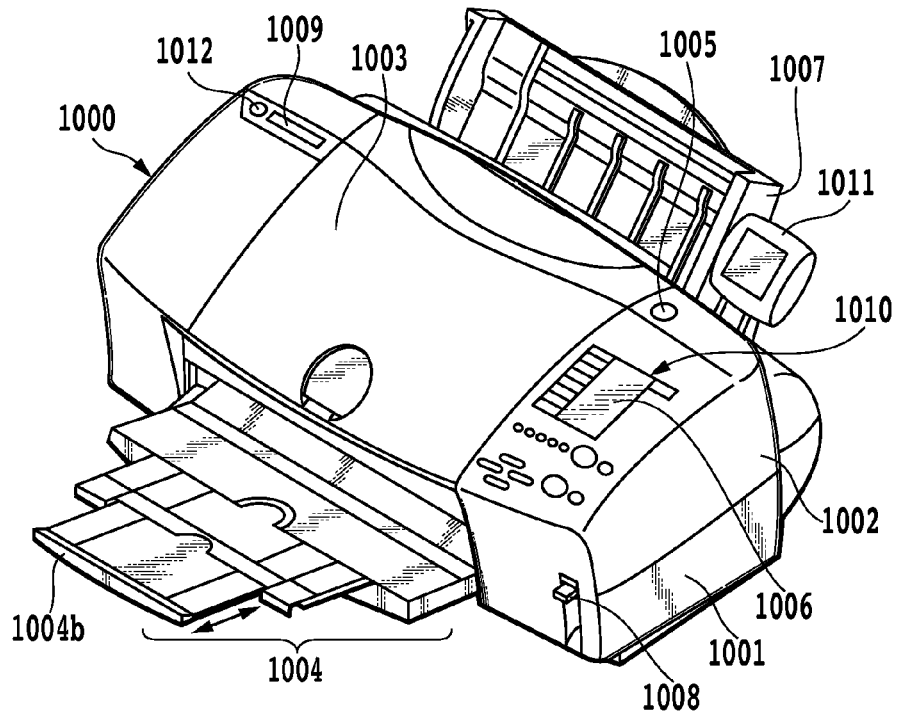
FIGS. 1A and 1B are diagrams illustrating the basic construction of an applicable printer of the present invention.

FIG. 1A is a perspective diagram of a photodirect printer (hereafter, referred to as a PD printer) 1000 that functions as the image processor of the present invention. The PD printer 1000 has a function for receiving and printing data from a host computer (PC), a function of directly reading and printing an image that is stored in a memory medium such as a memory card, and a function for receiving and printing an image from a digital camera, PDA or the like.

In the figure, reference number 1004 is a discharge tray in which printed paper can be stacked, and reference number 1003 is an access cover that can be opened and closed by the user when replacing the printing head cartridge or ink tank that are mounted in the main unit. Menu items for setting various conditions related to printing (for example type of printing medium, image quality, etc.) are displayed on a control panel 1010 that is provided on an upper case 1002, and the user can set these items according the type of image or the use of the image to be output. The reference number 1007 is an automatic feed unit that automatically feeds printing medium into the main body, reference number 1009 is a card slot into which a removable memory card adapter is inserted, and reference number 1012 is a USB terminal for connecting a digital camera. A USB connector is provided on the rear surface of the PD printer.

<Electrical Specifications of the Control Unit>

Figure 2:
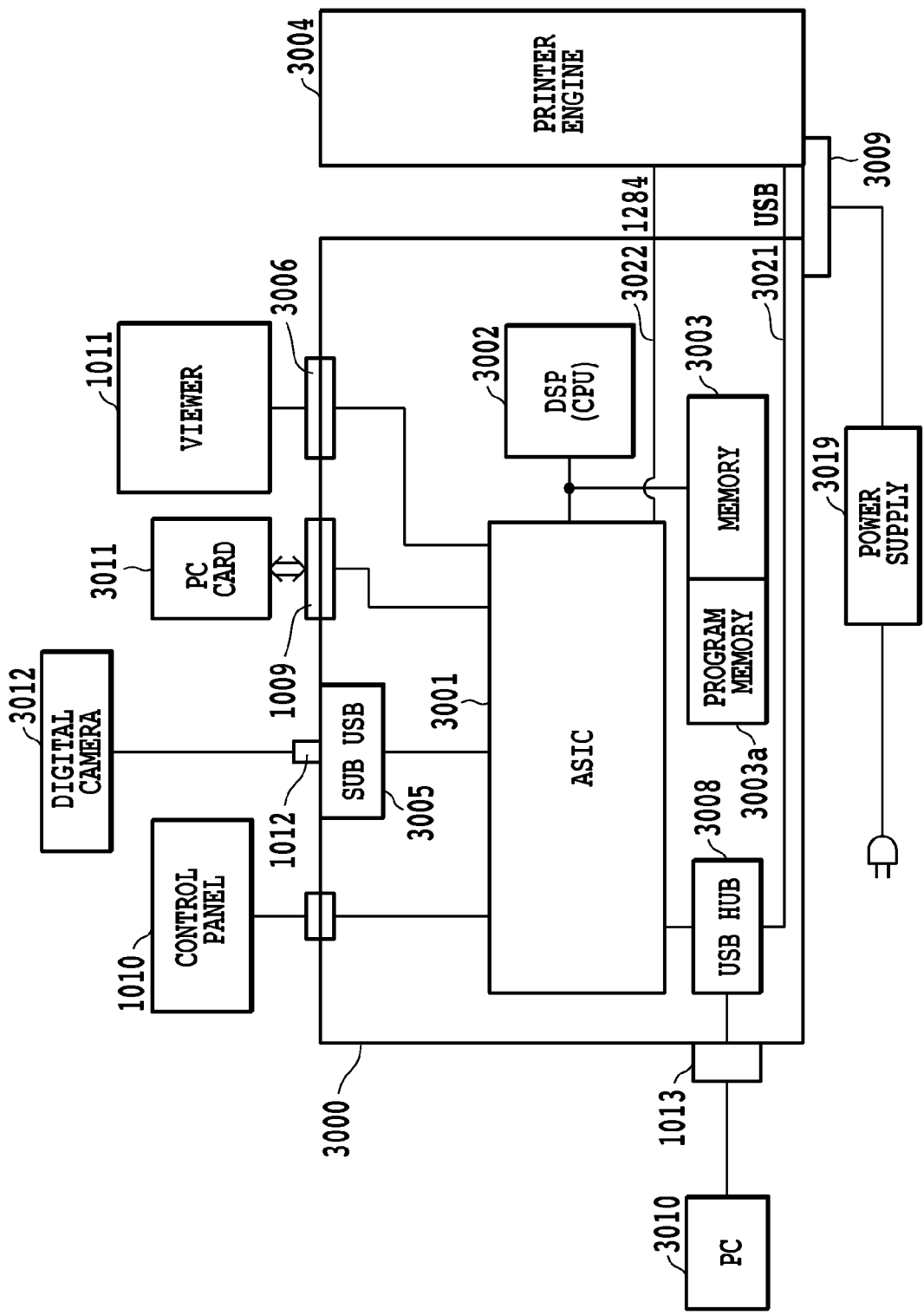
FIG. 2 is a block diagram illustrating the configuration of control of the printer in FIGS. 1A and 1B.

FIG. 2 is a block diagram illustrating the construction of the major parts related to control of the PD printer 1000 of embodiments of the invention. In FIG. 2, reference number 3000 is a control unit (control board), and 3001 is an image processing ASIC (special customized LSI). Reference number 3002 is a DSP (digital signal processor) having an internal CPU and is in charge of all kinds of control processing and all kinds of image processing that will be described later. Reference number 3003 is memory and comprises: a program memory 3003a that stores control programs for the CPU of the DSP 3002, a RAM area that stores programs used during execution, and a memory area that functions as work memory that stores image data and the like. Reference number 3009 is a printer engine, and here the printer engine is for an inkjet printer that prints color images using plurality of color ink. Reference number 3005 is a USB connector that functions as a port for connecting a digital camera (DSC) 3012. Reference number 3006 is a connector for, connecting a viewer 1011. Reference number 3008 is a USB hub (USB HUB), and when the PD printer performs printing based on image data from the PC 3010, allows the data from the PC 3010 to pass through as is, and outputs the data to the printer engine via the USB 3021. By doing so, the connected PC 3010 is able to execute printing by directly exchanging data and signals with the printer engine 3004 (functions as a normal PC printer). Reference number 3009 is a power-supply connector and inputs DC voltage from a power supply 3019 that has been converted from commercial AC voltage. The PC 3010 is a normal personal computer, reference number 3011 is the memory card (PC card) described above and 3012 is a digital camera (DSC). The exchange of signals between this control unit 300 and the printer engine 3004 is performed via the USB 3021 described above or an IEEE 1284 bus.

<Summary of the Printing Section>

Figure 1B:
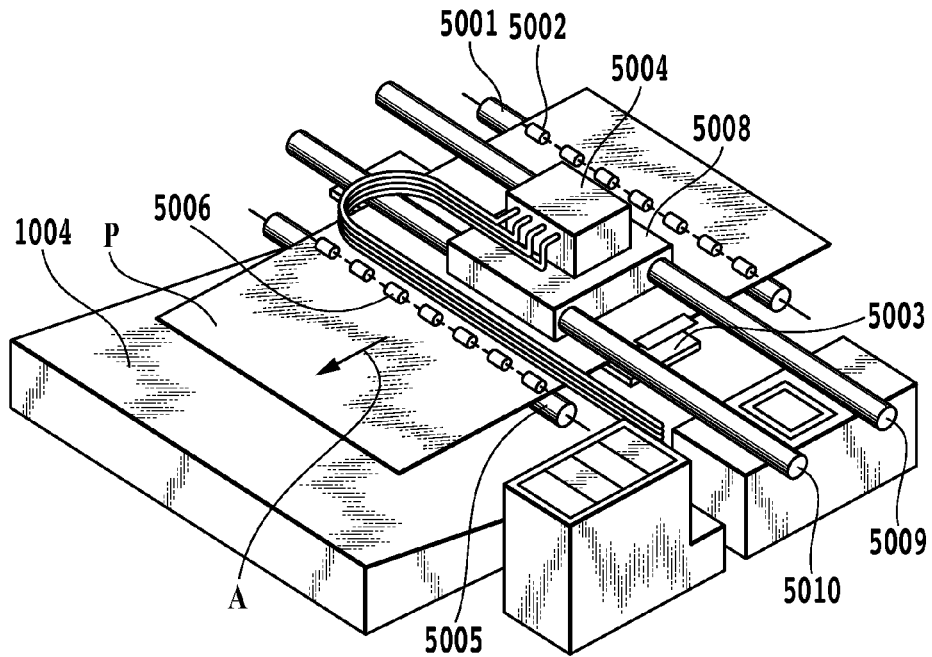

FIG. 1B is a perspective diagram illustrating the major parts of the printing section of the printer engine unit of the serial inkjet printer of embodiments of the invention. The printing medium P is fed from an automatic feed unit 1007 to nip sections of a conveying roller 5001 and pinch rollers 5002 that follow the conveying roller 5001 and that are located on the conveying path. After that, the printing medium P is conveyed in the direction of arrow A in the figure (sub scanning direction) by the rotation of the conveying roller 5001 while being guided and supported by a platen 5003. The pinch rollers 5002 elastically press against the conveying roller 5001 by a pressure unit such as a spring (not shown in the figure). The conveying roller 5001 and pinch rollers 5002 are component elements of a first conveying unit on the up-line side in the conveying direction of the printing medium.

The platen 5003 is located in the printing position and faces the surface of the inkjet-type printing head 5004 on which the discharge outlets are formed, and by supporting the back surface of the printing medium P, maintains a fixed distance between the front surface of the printing medium and the ejection face. The printing medium P that is conveyed over the platen 5003 and on which printing is performed is held between the discharge roller 5005 and the spurs 5006, which are rotating bodies that follow the discharge roller 5005, and conveyed in the A direction, then discharged from the platen 5003 to the discharge tray 1004. The discharge roller 5005 and spurs 5006 are component elements of a second conveying unit that is located down-line in the conveying direction of the printing medium.

The printing head 5004 is positioned such that the ejection face thereof faces the platen 5003 or printing medium P, and is removable from the carriage 5008. The carriage 5008 is driven by the driving force of a carriage motor E0001 such that it moves back and forth along two guide rails 5009 and 5010, and during that moving process, the printing head 5004 executes the operation of discharging ink according to a printing signal. The direction that the carriage 5008 moves in is a direction orthogonal to the direction the printing medium is conveyed in (direction of arrow A), and is called the main scanning direction. On the other hand, the direction the printing medium is conveyed in is called the sub scanning direction. Printing is performed on the printing medium by alternately repeating main scanning by the carriage 5008 and the printing head 5004 and conveying (sub scanning) of the printing medium.

Figure 16:
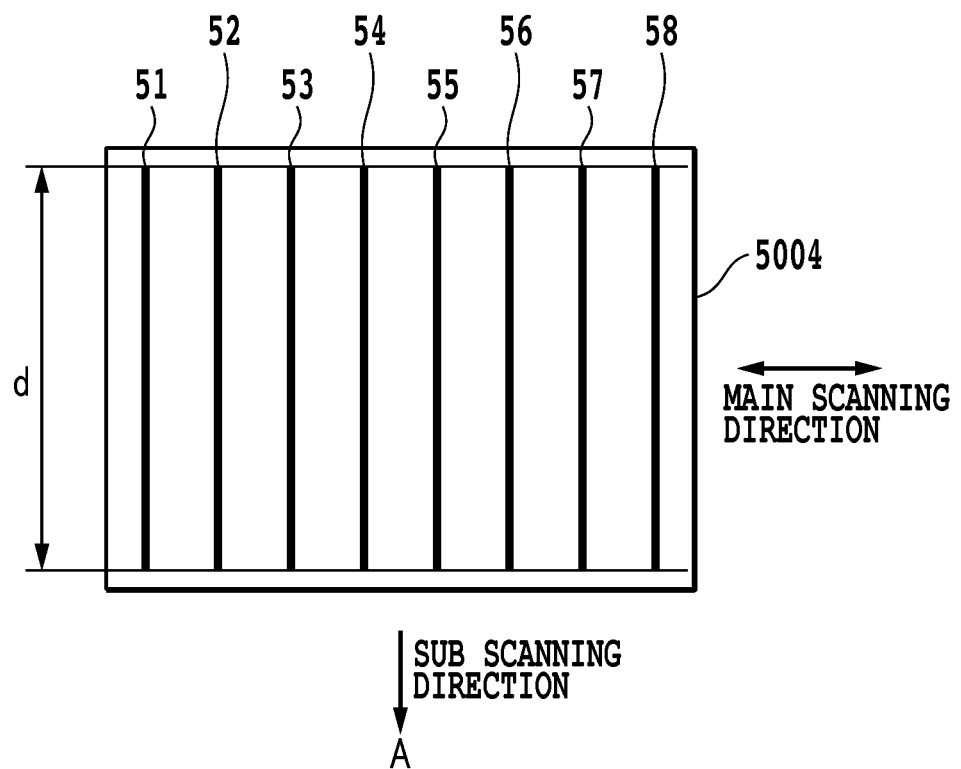
FIG. 16 is a diagram of a printing head when observed from the surface where discharge ports are formed.

FIG. 16 is a diagram of the printing head 5004 when observed from the surface where the discharge ports are formed. In the figure, 51 and 52 are first and second cyan nozzle arrays (printing element groups), and 52 and 57 are first and second magenta nozzle arrays. In addition, 53 and 56 are first and second yellow nozzle arrays, and 54 and 55 are first and second black nozzle arrays. The width in the sub scanning direction of each nozzle array is d, and printing having a width d is possible in one scan. The printing head 5004 of the embodiments comprises two nozzle arrays for each color cyan (C), magenta (M), yellow (Y) and black (K) that discharge nearly the same amount of ink and print dots that are nearly the same size, and performs printing on a printing medium using both nozzle arrays. By doing so, it is possible to reduce by approximately ½ the density unevenness and stripes that occur due to variation in the individual nozzles.

Furthermore, the printer of the embodiments executes multipass printing, so the printing head 5004 gradually forms an image by performing a plurality of printing scans with respect to an area that can be printed in one printing scan. When doing this, by conveying the printing medium an amount that is less than the width d of the printing head between each printing scan, it is possible to further reduced density unevenness and stripes due to variation in each individual nozzle. FIG. 7 is a diagram that schematically illustrates the printing state of 2-pass printing, and illustrates the relative positional relationship between the printing head 5009 and printing area when printing from a first printing area to a fourth printing area that correspond to four same areas. Whether or not to perform multipass printing, or the number of multipass number (number of printing scans over the same area) is determined according to information that is inputted by the user from the control panel 1010, or image information that is received from the host device.

<Relationship Between Control of the Dot Overlap Rate and Density Unevenness and Graininess>

Figure 10A:
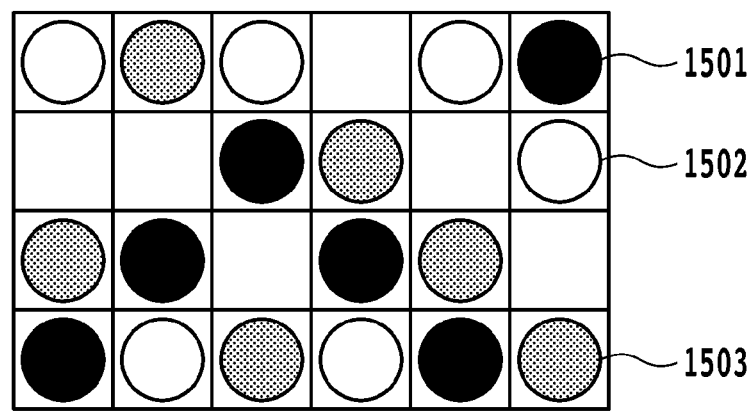
FIGS. 10A to 10C are diagrams for explaining the relationship between dot arrangement and graininess.
Figure 10B:
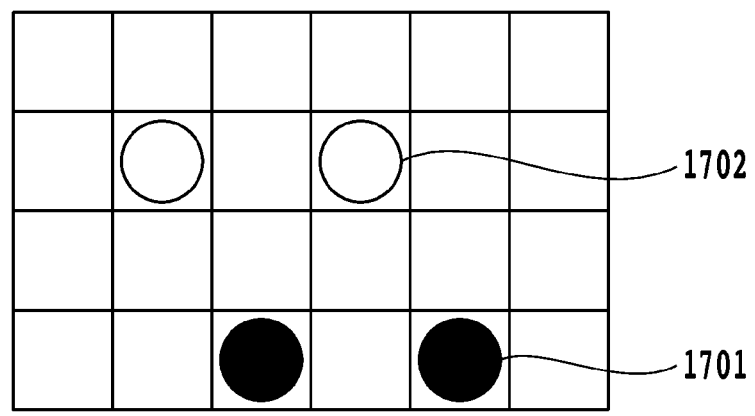
Figure 10C:
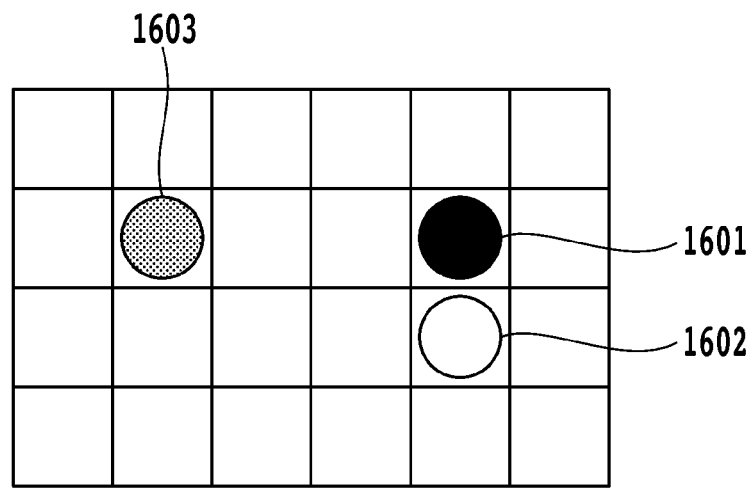

As was mentioned in the section on the background of the invention, when dots that are printed by different scans or different printing element groups are shifted and overlap, density fluctuation occurs in the image, and this is perceived as density unevenness. Therefore, in the present invention, some dots that are to overlap and be printed at the same position (same pixel of same sub pixel) are prepared beforehand, and when deviation of the printing position occurs, adjacent dots overlap each other, resulting in an increase of blank areas, and, overlapping dots separate from each other, resulting in a decrease of blank areas. In this way, the increase and decrease in blank areas, or in other words, the increase and decrease in density due to deviation of the printing position, compensate for each other, so suppression of a change in density of the overall image can be expected. However, as was explained using FIGS. 10B and 10C, preparing overlapping dots in advance is connected with worsening of the graininess. In other words, when adjusting the number of overlapping dots in advance, there can be said to be a tradeoff relationship between the density unevenness and the graininess.

However, as already explained, there is a certain allowable range for both density change and graininess, and these allowable ranges change depending on the characteristic (content) of the image to be output. For example, in the case where the original image is a portrait, the observer tends to pay attention to the face and skin of the person, and observe the image at close range. Therefore, for a case of portrait, it is important that to suppress the graininess which tends to stand out in observation at close range. At the same time, the density unevenness which tends to stand out in observation at long range cannot become a problem. Therefore, in the embodiments, when the characteristic of an image that is the object of processing is a portrait, the dot overlap rate is set relatively low.

On the other hand, in the case of a photograph of scenery, for example, the observer usually observes the image in a broad range at long range, and thus more than the graininess of a certain area, the density unevenness that occurs overall in the entire image easily becomes a problem. Even in the case of an image that is not a photograph of scenery, in an image other than a portrait, the density unevenness of the entire image often stands out than the graininess. Therefore, in the embodiments, when the characteristic of the image that is to be the object of processing is something other than a portrait, the dot overlap rate is set to be relatively large.

In the present invention, the dot overlap rate is prepared such that it can be controlled in this way, and a balance between density unevenness and graininess is maintained for images having any kind of characteristic by adjusting the dot overlap rate according to the characteristic of the image to be output.

Here, the "dot overlap rate" will be explained. The "dot overlap rate", as illustrated in FIGS. 4A to 4H and FIG. 15, is the ratio of the number of dots, that overlap (overlapping dots) and are printed in the same pixel by a different scan or different printing element group, from among the total number of dots that are to be printed in a unit area comprising K (K is an integer 1 or greater) number of pixels. The same pixel is the same pixel position in the case of FIGS. 4A to 4H, and is a sub pixel position in the case of FIG. 15.

In the following, the dot overlap rate of a first plane and a second plane that correspond to a unit area that comprises 4 pixels (main scanning direction)×3 pixels (sub scanning direction) is explained using FIGS. 4A to 4H. The "first plane" is a collection of binary data that corresponds to the first scan or first nozzle array, and the "second plane" is a collection of binary data that corresponds to the second scan or second nozzle array. Moreover, "1" is data that indicates that a dot is printed, and "0" is data that indicates that a dot is not be printed.

In FIGS. 4A to 4E, the number of "1s" in the first plane is "4", and the number of "1s" in the second plane is also "4", so that the total number of dots to be printed in a unit area comprising 4 pixels×3 pixels is "8". On the other hand, the number of "1s" in the first plane and the second plane that correspond to the same pixel position becomes the number of dots that will overlap and be printed in the same pixel (over-lapping dots). According to this definition, the number of overlapping dots in the case of FIG. 4A is "0", in the case of FIG. 4B is "2", in the case of FIG. 4C is "4", in the case of FIG. 4D is "6" and in the case of FIG. 4E is "8". Therefore, as illustrated in FIG. 4H, the respective dot overlap rates for FIGS. 4A to 4E are, 0%, 25%, 50%, 75% and 100%. Furthermore, FIG. 4F illustrates the case in which the number of dots printed in the first plane is "4", the number of dots printed in the second plane is "3", the total number of dots is "7", the number of overlapping dots is "6" and the dot overlap rate is 86%. In addition, FIG. 4G illustrates the case in which the number of dots printed in the first plane is "4", the number of dots printed in the second plane is "2", the total number of dots is "6", the number of overlapping dots is "2" and the dot overlap rate is 33%.

In this way, the "dot overlap rate" in this specification, is the overlap rate of dot data when dot data that correspond to different scans or different printing element groups virtually overlap.

A detailed explanation of the image processing method for controlling the dot overlap rate of the present invention will be explained below with a few embodiments as examples.

Embodiment 1

Figure 3:
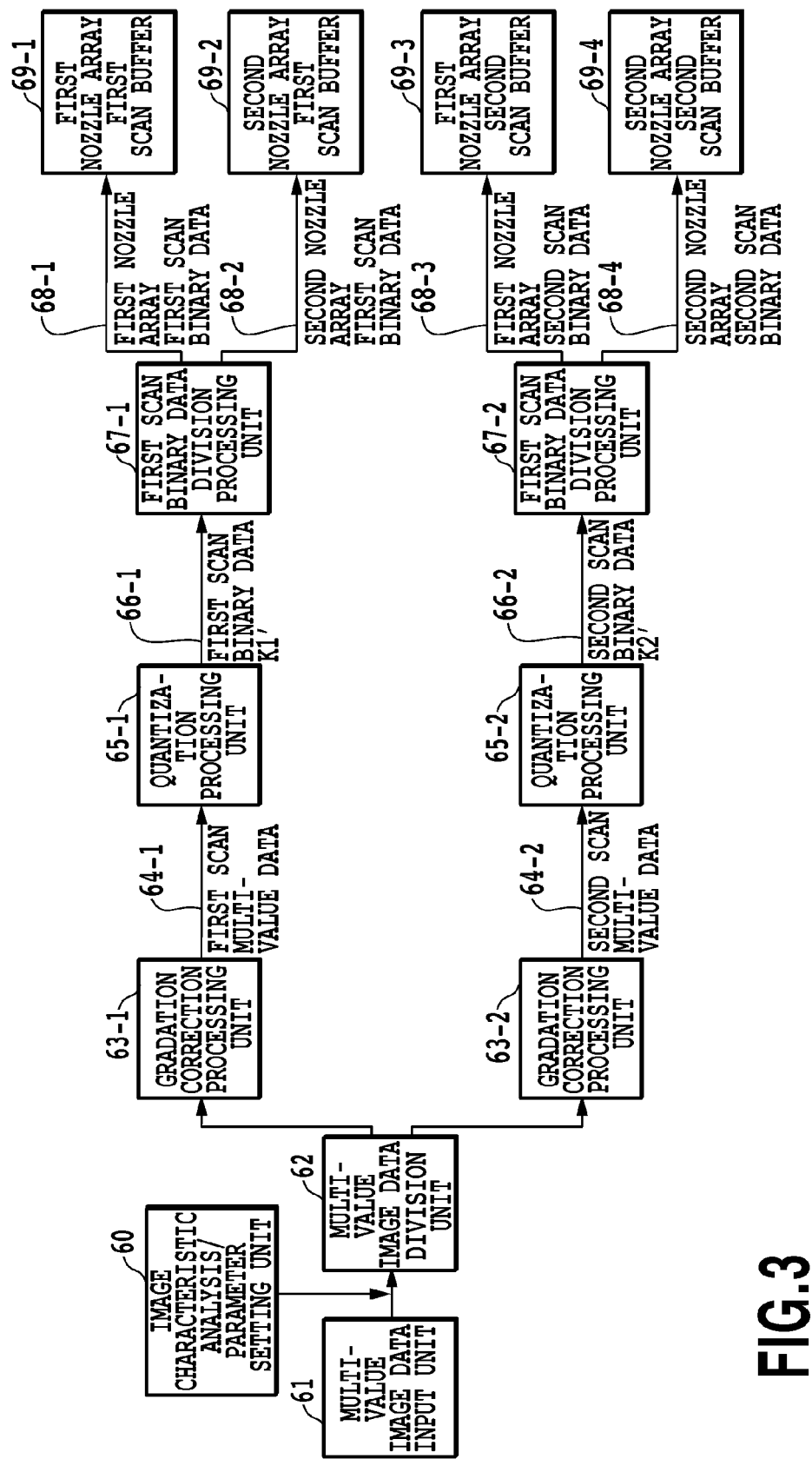
FIG. 3 is a block diagram for explaining the steps of image processing of a first embodiment.

FIG. 3 is a block diagram for explaining image processing in the case of performing multipass printing to complete an image in the same area on a printing medium by two printing scans as illustrated in FIG. 7. A control unit 3000 comprises: a multi-value image data input unit (61), a color conversion/image data division unit (62), gradation correction processing units (63-1, 63-2) and quantization processing units (65-1, 65-2). On the other hand, a printer engine 3004 comprises binary data division processing units (67-1, 67-2).

When multi-value RGB image data (256 values) is inputted from an external device by way of the multi-value image data input unit 61, this inputted image data (original image) is sent to an image characteristic analysis/parameter setting unit 60. The image characteristic analysis/parameter setting unit 60 examines the entire original image and analyzes whether the original image is a portrait (first characteristic) or something else (characteristic 2), then sets a parameter in memory 3003 for adjusting the dot overlap rate according to that result. A method such as the method disclosed in Japanese Patent Laid-Open No. 2005-173932 is used as the method for analyzing the image. Moreover, as long as the image data is in Exif (Exchangeable Image File Format) that is standardized by the JEITA, an image can be judged from the image data and tags attached to the image data. It is also possible judge an image according to imaging conditions such as a portrait mode or landscape mode that is set for a digital camera.

Figure 12A:
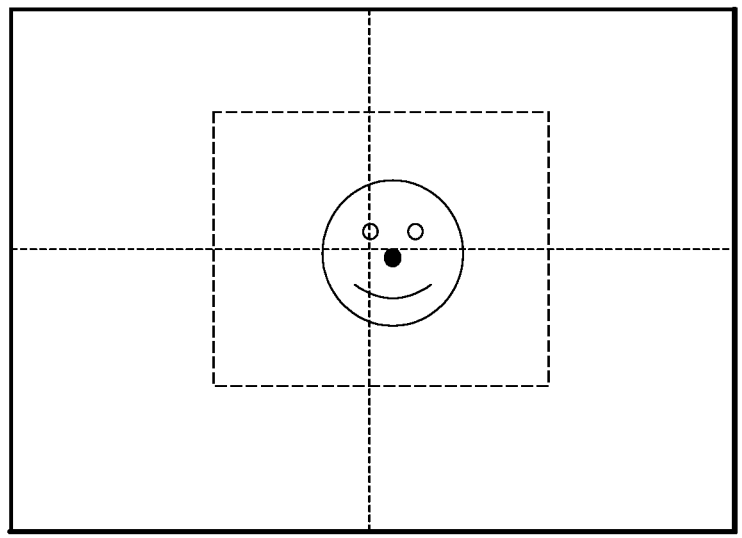
FIGS. 12A and 12B are diagrams that illustrate an example of determining the image characteristic from the position of a face area.
Figure 12B:
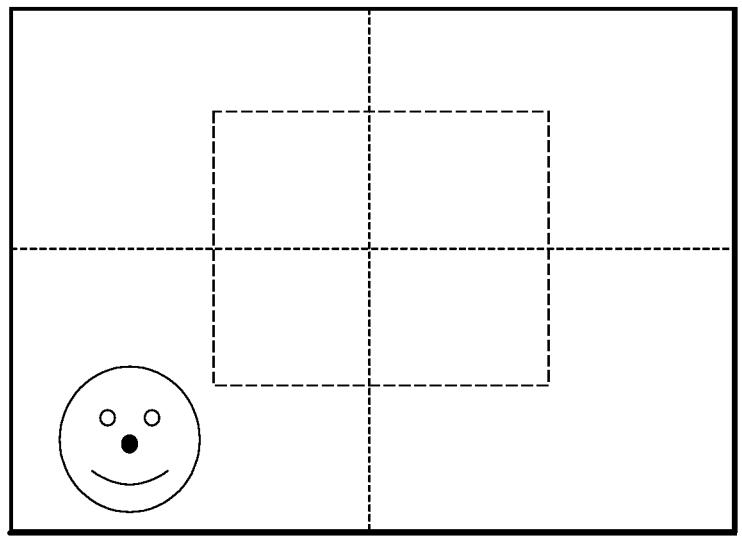

Even though the surface area of a face is a specified ratio or greater, it is possible to determine whether or not that image is a portrait according to the position of the face area. In other words, when the area of the face is near the center of the image as illustrated in FIG. 12A, the observer pays most attention to the face area, so the image is determined to be a portrait (first characteristic). On the other hand, even when the surface area of the face is a specified ratio or greater, when that area is separated from the center of the image as illustrated in FIG. 12B, the image is determined not to be a portrait (second characteristic). In either case, it is preferred that the image characteristic be determined so that the image quality of the area that the observer pays most attention to can take preference.

The multi-value image data (multi-value RGB data) for which the image characteristic has been determined, is inputted to the color conversion/image data division unit 62 for each pixel, and two divisions of multi-value data (multi-value density data) for the first printing scan and second printing scan corresponding to each ink color (CMYK) are generated. More specifically, a 3-dimensional look up table (LUT), in which the RGB values and CMYK values for the first scan and CMYK values for the second scan are correlated one on one, is provided in advance in the color conversion/image data division unit 62. By using this LUT, multi-value density data for the first scan and multi-value density data for the second scan is generated at once from the RGB data. When doing this, output values can be calculated for input values that are separated from the values of the lattice points of the table by interpolation from the output values of surrounding table lattice points. This kind of color conversion/image data division unit 62 has the role of two processes; a color conversion process for converting RGB data to CMYK data, and a division processing for dividing multi-value image data into a plurality of planes.

In this way, the color conversion/image data division unit 62 performs the role of a data generation unit that generates multi-value data (CMYK) for the first scan, and multi-value data (CMYK) for the second scan. In this embodiment, control of the dot overlap rate is achieved by providing a feature in the data conversion that is executed by this color conversion/image data division unit. This control method will be explained in detail later.

The generated multi-value data for the first scan and the multi-value data for the second scan undergo gradation correction processing for each color by the gradation correction processing units 63-1 and 63-2. Here, signal value conversion of the multi-value data is performed so that the relationship between the signal values of the multi-value data and the density values that are expressed on the printing medium becomes linear. As a result, multi-value data 64-1 (C1, M1, Y1, K1) for the first scan and multi-value data 64-2 (C2, M2, Y2, K2) for the second scan are obtained. The processing described below is performed the same for all of the colors CMYK, so just the processing for the color black K will be explained below.

The quantization processing unit 65-1 performs binarization processing of the multi-value data 64-1 (K1) for the first scan to generate binary data K1' 66-1 for the first scan. Moreover, the quantization processing unit 65-2 performs binarization processing of the multi-value data 64-2 (K2) for the second scan to generate binary data K2' 66-2 for the second scan. In this embodiment, the quantization method that is employed for the two quantization processing units 65-1 and 65-2 is the normal error-diffusion method. When performing quantization, in order to adequately mix pixels in which dots are printed in both scans, and pixels in which dots are printed in only one scan, it is preferred that a different diffusion matrix be used in these two error-diffusion processes. For example, the quantization processing unit 65-1 uses the diffusion matrix that is illustrated in FIG. 9A, and the quantization processing unit 65-2 uses the diffusion matrix that is illustrated in FIG. 9B. Dots overlap and are printed in pixels for which both of the results K1', K2' of the two quantization processes are 1, and no dots are printed in pixels for which both K1' and K2' are 0. Only one dot is printed in pixels for which only one of K1' and K2' is 1.

After binary image data K1' and K2' have been obtained from the quantization processing units 65-1 and 65-2, the data are sent to the printer engine 3009 illustrated in FIG. 2 via an IEEE 1284 bus 3022. The processing after this is executed by the printer engine 3004.

In the printer engine 3004, the binary image data K1' (66-1) and K2' (66-2) are divided into binary data that correspond to the two nozzle arrays 51 and 55 illustrated in FIG. 16. The binary data K1' (66-1) for the first scan is divided by a first scan binary data division processing unit 67-1 into binary data 68-1 for the first scan by the first nozzle array, and binary data 68-2 for the first scan by the second nozzle array. Moreover, the binary data K2' (66-2) for the second scan is divided by a second scan binary data division processing unit 67-2 into binary data 68-3 for the second scan by the first nozzle array, and binary data 68-4 for the second scan by the second nozzle array.

In this embodiment, the first scan binary data division processing unit 67-1 and second scan binary data division processing unit 67-2 execute the division processing by using masks that are stored beforehand in memory (ROM E1004). A mask is a collection of data for which whether to allow printing (1) or no allow printing (0) is preset for each individual pixel, and divides the binary data by performing a logical AND operation with each binary image data for each pixel.

Figure 5:
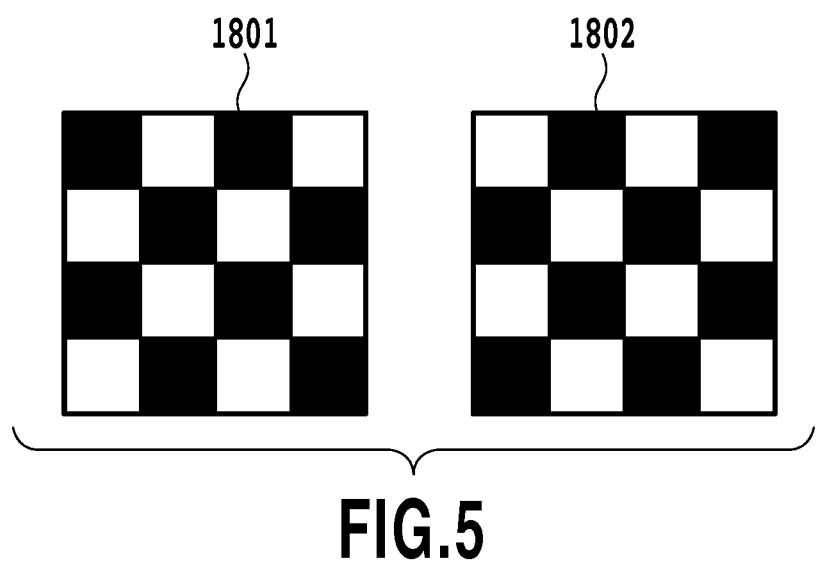
FIG. 5 is a diagram that illustrates one example of an applicable mask of the present invention.

In the case of dividing the binary image data into N number of divisions, normally N number of mask are used, and in this embodiment in which the binary image data is divided into two divisions, two masks 1801, 1802 as illustrated in FIG. 5 are used as an example. In FIG. 5, the portions indicated by black are data for which printing image data is allowed (1: data for which image data is not masked), and the portions indicated by white are data for which printing image data is not allowed (0: data for which image data is masked). Here, the mask 1801 is used for generating binary data for the first nozzle array, and the mask 1802 is used for generating binary data for the second nozzle array. In other words, the first scan binary data division processing unit 67-1 generates binary data 68-1 for the first nozzle array by performing a logical AND operation of the binary data K1' (66-1) and the mask 1801 for each pixel. Similarly, the first scan binary data division processing unit 67-1 generates binary data 68-2 for the second nozzle array by performing a logical AND operation of the binary data K1' (66-1) and the mask 1802 for each pixel. On the other hand, the second scan binary data division processing unit 67-2 generates binary data 68-3 for the first nozzle array by performing a logical AND operation of the binary data K2' (66-2) and the mask 1801 for each pixel. Similarly, the second scan binary data division processing unit 67-2 generates binary data 68-4 for the second nozzle array by performing a logical AND operation of the binary data K2' (66-2) and the mask 1802 for each pixel.

The two masks 1801 and 1802 have a complementary relationship with each other, so the binary data divided by these masks will not overlap each other. Therefore, the probability that dots from different nozzle arrays will overlap on the surface of the paper is kept low, and when compared with dot overlap rate control that is performed between scans as described above, it is more difficult for graininess to worsen. In this embodiment, the first scan binary data division processing unit 67-1 and second scan binary data division processing unit 67-2 use the same mask set (1801 and 1802), however; they could use a different mask set.

After that, each binary image data (68-1 to 4) is stored in buffers 69-1 to 4 that are prepared for each scan that corresponds to the corresponding nozzles. After the necessary amount of binary image data has been stored in each individual buffer, the printing operation is executed by the corresponding scans and nozzle arrays according to the stored data.

The processing method for controlling the characteristic dot overlap rate of this embodiment is explained below. Table 1 illustrates the distribution rates when the color conversion/image data division processing unit 62 divides data to multi-value data for the first scan and for the second scan, and dot overlap rates in the first scan and second scan when the typical error-diffusion process of the first embodiment is performed for each of the multi-value data. The printing rate (%) corresponds to the number of dots of one color of ink that are printed per unit area, and is 0% when no dots are printed per unit area, and is 100% when the maximum number of dots are printed per unit area. Therefore, for example, a printing rate of 60% indicates a state in which a number of dots that corresponds to 60% of the maximum number of dots are printed per unit area. In Table 1, this kind of printing rate is given in ten levels from 0 to 100%. As will be explained later, this printing rate (0 to 100%) is correlated with the total value (0 to 255) of the multi-value density data of the same color among different scans, and the larger the value of the printing rate becomes, the larger the total value becomes. Moreover, the distribution rate (%) is the ratio of the value of the density data of each scan with respect to the total value of multi-value density data of the same color among a plurality of scans (printing rate), where the total of the distribution rates is 100%. In this way, the distribution rate corresponds to the ratio (distribution ratio) of a plurality of density data values of the same color after conversion of the input image data (RGB) (for example K1:K2). For example, here the case in which the total value of a plurality of density data that corresponds to a plurality of scans is 128 (printing rate of 50%), the density data value for the first scan is 64 (printing rate of 25%), and the density data value for the second scan is also 64 (printing rate of 25%) is considered. In this case, the distribution rates of the first scan and the second scan are both 50%, and the ratio of the first density data for the first scan and the second density data for the second scan becomes 1:1. In Table 1, this kind of distribution rate is given in 6 levels. In addition, the dot overlap rates resulting from binarization processing by the typical error-diffusion method are illustrated in each column of Table 1 according to the distribution rate and printing rate conditions.

second scan is 50%, the slope of the dot overlap rate with respect to the printing rate is a maximum, and when the printing rate is 100% the dot overlap rate becomes 50%.

Figure 6:
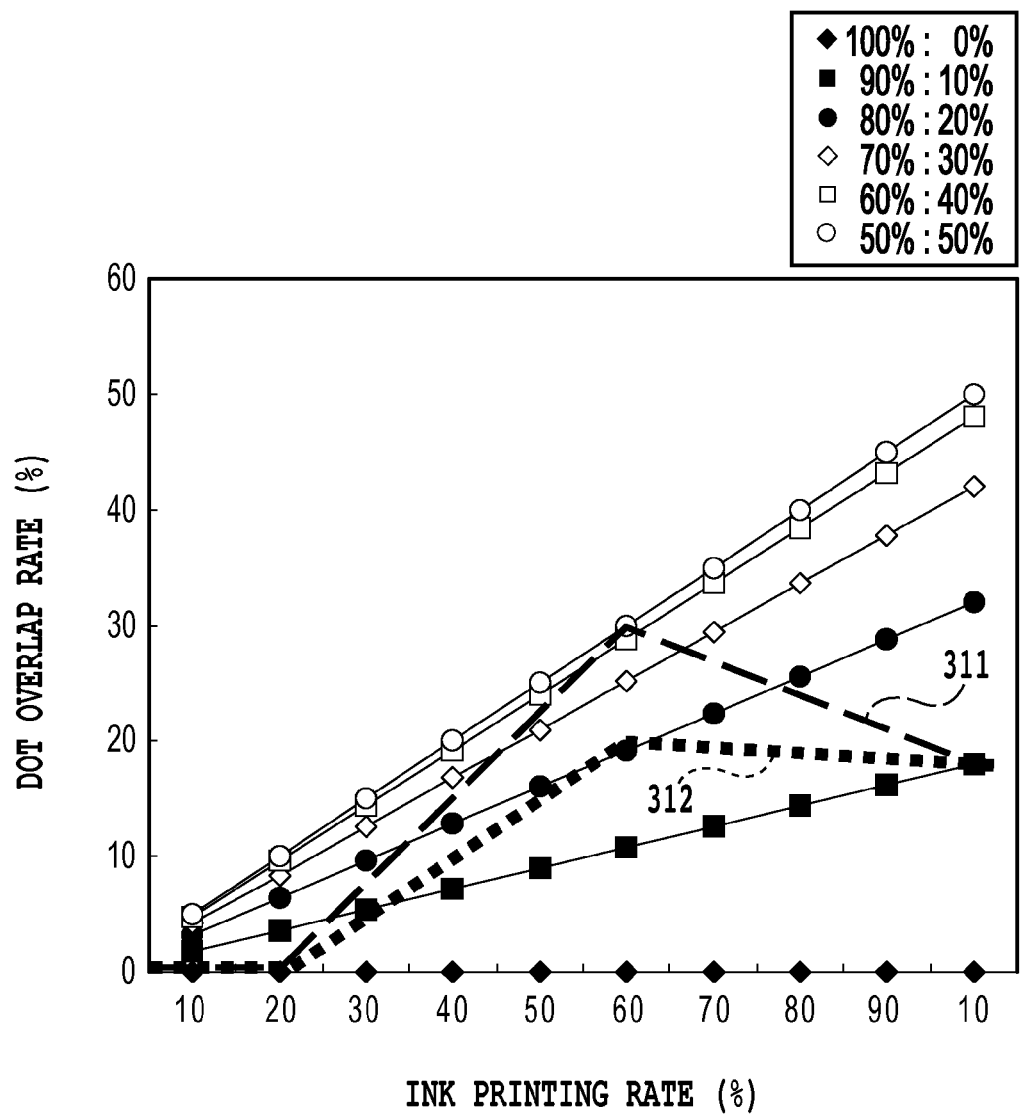
FIG. 6 is a diagram illustrating the relationship between the distribution rate and dot overlap rate of a first embodiment.

Therefore, by obtaining in advance the dot overlap rates with respect to distribution rates as illustrated in Table 1 and FIG. 6, it becomes possible to achieve a suitable dot overlap rate for each image characteristic by adjusting the distribution rate according to the image characteristic.

In this embodiment, it is possible to perform even more detailed control of the dot overlap rate. Typically, in addition to the image characteristic, of the areas of all printing rates (0% to 100%), areas of medium gradation, or in other words, areas where dots are printed or not printed adjacent to each other, the change in the dot overlap state easily affects the dot coverage rate on the paper surface. Therefore, in these kinds of medium-density areas, it is particularly easy for density unevenness to become a problem, so preferably the dot overlap rate is set higher than in other density areas (low-density areas, high-density areas). On the other hand, in low-density areas where it is difficult for density unevenness to become a problem, the reduction of graininess takes priority over the reduction of density unevenness, so the dot overlap rate is preferably set low. Moreover, in high-density areas where increasing density takes priority over the reduction of density unevenness, the dot overlap rate is preferably set low. Therefore, in this embodiment, the dot overlap rate is adjusted according to not only the image characteristic, but also according to the printing rate.

The solid dashed lines 311 and 312 in FIG. 6 illustrate the adjustment of the dot overlap rate according to the printing rate (that is, total value of a plurality of multi-value density data that corresponds to different scans). In this embodiment, when the original image is a portrait, the dot overlap rate is control by the curve 312, and when the original image is other than a portrait, the dot overlap rate is controlled by the curve 311. When the original image is a portrait, in order to achieve a dot overlap rate such as indicated by curve 312, the distribution rate at a printing rate of 0 to 20% is taken to be (100%:0%), and at a printing rate of 20 to 60%, the distribu-

TABLE 1

| Distribution rate (%) | | Printing rate (%) | | | | | | | | |
|---|---|---|---|---|---|---|---|---|---|---|
| First scan | Second scan | 10 | 20 | 30 | 40 | 50 | 60 | 70 | 80 | 90 | 100 |
| 100 | 0 | 0 | 0 | 0 | 0 | 0 | 0 | 0 | 0 | 0 | 0 |
| 90 | 10 | 1.8 | 3.6 | 5.4 | 7.2 | 9 | 10.8 | 12.6 | 14.4 | 16.2 | 18 |
| 80 | 20 | 3.2 | 6.4 | 9.6 | 12.8 | 16 | 19.2 | 2.4 | 25.6 | 28.8 | 32 |
| 70 | 30 | 4.2 | 8.4 | 12.6 | 16.8 | 21 | 25.2 | 29.4 | 33.6 | 37.8 | 42 |
| 60 | 40 | 4.8 | 9.6 | 14.4 | 19.2 | 24 | 28.8 | 33.6 | 38.4 | 43.2 | 48 |
| 50 | 50 | 5 | 10 | 15 | 20 | 25 | 30 | 35 | 40 | 45 | 50 |

FIG. 6 is a graph of Table 1. In the FIG. 6, the horizontal axis represents the printing rate, and the vertical axis represents the dot overlap rate. The graph illustrates the dot overlap rate with respect to the printing rate for each of the distribution rates of the 6 levels illustrated in Table 1 as lines having different slopes.

For example, when the distribution rate of the first printing scan is 100% and the distribution rate of the second printing scan is 0%, then all of the multi-value data is printed in just the first printing scan. Therefore, there is no dot overlap, and even though the printing rate is increased, the dot overlap rate remains at 0%. As the distribution rate of the second printing scan is gradually increased, the slope of the dot overlap rate with respect to the printing rate gradually increases. Moreover, when the distribution rate of both the first scan and tion rate is gradually changed until it becomes (80%:20%). In addition, in high-density areas where the printing rate is 60 to 100%, the distribution rate is gradually changed until it becomes (90%:10%). On the other hand, when the original image is something other than a portrait, in order to achieve a dot overlap rate such as indicated by curve 311, the distribution rate at a printing rate of 0 to 20% is taken to be (100%:0%), and at a printing rate of 20 to 60%, the distribution rate is gradually changed until it becomes (50%:50%). Moreover, in high-density areas where the printing rate is 60 to 100%, the distribution rate is gradually changed until it becomes (90%:10%). In order to suppress the generation of a pseudo contour, the distribution rate is preferably changed as smoothly as possible.

In this embodiment, when the original image is a portrait or something other than a portrait, the point of making the dot overlap rate a maximum at a printing rate of approximately 60% is the same. However, at any ink printing rate, the dot overlap rate for a portrait image does not exceed that dot overlap rate of an image that is not a portrait. In other words, in all ink printing rate areas, the dot overlap rate of a portrait image for which reduction of graininess is most important is set to be the same or less than the dot overlap rate of an image that is something other than a portrait.

In the explanation above, an example of 2-pass multipass printing was explained, however; the method of controlling the dot overlap rate by this kind of adjustment of the distribution rate can be applied to 3-pass or greater multipass printing. In that case, the color conversion/image data division unit 62 illustrated in FIG. 3 divides the data into M number of multi-value density data that correspond to M number of printing scans, and quantization processing is executed for each division of multi-value image data. In addition, the relationship between the printing rate and dot overlap rate as illustrated in FIG. 6 is found in advance for M passes, and the color conversion/image data division unit can divide the data into M number of multi-value density data according to a distribution rate that makes possible a dot overlap rate that is suitable to the original image.

In this embodiment, in order to optimally set the dot overlap rate in this way according to the image characteristic, the image characteristic analysis/parameter setting unit 60 analyzes the image characteristic and generates a parameter according to the image characteristic. Moreover, the color conversion/image data division unit 62 divides the multi-value image data into M number of planes according to the distribution rate that corresponds to the parameter. More specifically, when the image characteristic is a portrait, the color conversion/image data division unit 62, with the bias of the distribution rate small, generates M number of density data for M number of passes so that the dot overlap rate becomes lower than when the image characteristic is not a portrait.

Incidentally, in this embodiment, the color conversion/image data division unit 62 generates a plurality of density data (plurality of CMYK sets) to correspond to a plurality of scans at once from inputted image data (RGB), so the parameters that correspond to the "printing rate" illustrated in Table 1 and FIG. 6 are not actually used. However, the total value of a plurality of density data of the same color after generation is correlated with the printing rate, and as the total value becomes large, the printing rate after binarization becomes large as a result. In other words, the total value of the plurality of density data that corresponds to different scans corresponds to the "printing rate". Therefore, in actual processing, the inputted image data (RGB) and the plurality of density data (plurality of CMYK sets) can be correlated so that the relationship in the 3-dimensional LUT between the total value of a plurality of density data of the same color (printing rate) and the distribution rate satisfy the relationship illustrated in FIG. 6. The color conversion/image data division unit 62 generates data using this kind of LUT. By doing so, the ratio of a plurality of density data for the same color (distribution rate) is primarily set according to the input image data that is correlated with the printing rate and total value described above, so the relationship between the printing rate and the distribution rate illustrated in Table 1 can be satisfied without using the "printing rate" parameter. Therefore, it is possible to achieve a dot overlap rate that corresponds to the printing rate as illustrated in FIG. 6.

However, in the present invention and this embodiment, it is not absolutely necessary for the color conversion/image data division unit 62 to convert all of the multi-value brightness data (RGB) to a plurality of multi-value density data (CMYK) using a 3-dimensional LUT as illustrated in FIG. 3 at once. The process of performing color conversion from RGB data to CMYK data and the process of dividing CMYK data into a plurality of density data that corresponds to a plurality of scans could be provided independently. In that case, a plurality of multi-value density data can be generated according to a distribution rate that is set according to multi-value data after color conversion, or in other words, according to a distribution rate illustrated in FIG. 6.

In Table 1, the distribution rates are set such that the sum of the distribution rates for the first print scan and the second printing scan set by the color conversion/image data division processing unit 62 is 100%, however; this embodiment is not limited to this. Depending on the type of image processing or the objective of improving the absolute density, the sum of distribution rates for the first printing scan and the distribution rates for the second printing scan can be 100% or greater, or could be kept to less than 100%.

As was explained above, with this embodiment, by changing the ratio of multi-value density data for the same color that corresponds to a plurality of scans (distribution rate) according to the image characteristic, it is possible to achieve a dot overlap rate that is suitable for the output image. By doing so, it is possible to output a good image that is suitable to the image characteristic by lowering the dot overlap rate of a portrait image, which takes graininess into consideration more than density unevenness, more than the dot overlap rate of other kinds of images.

Figure 8:
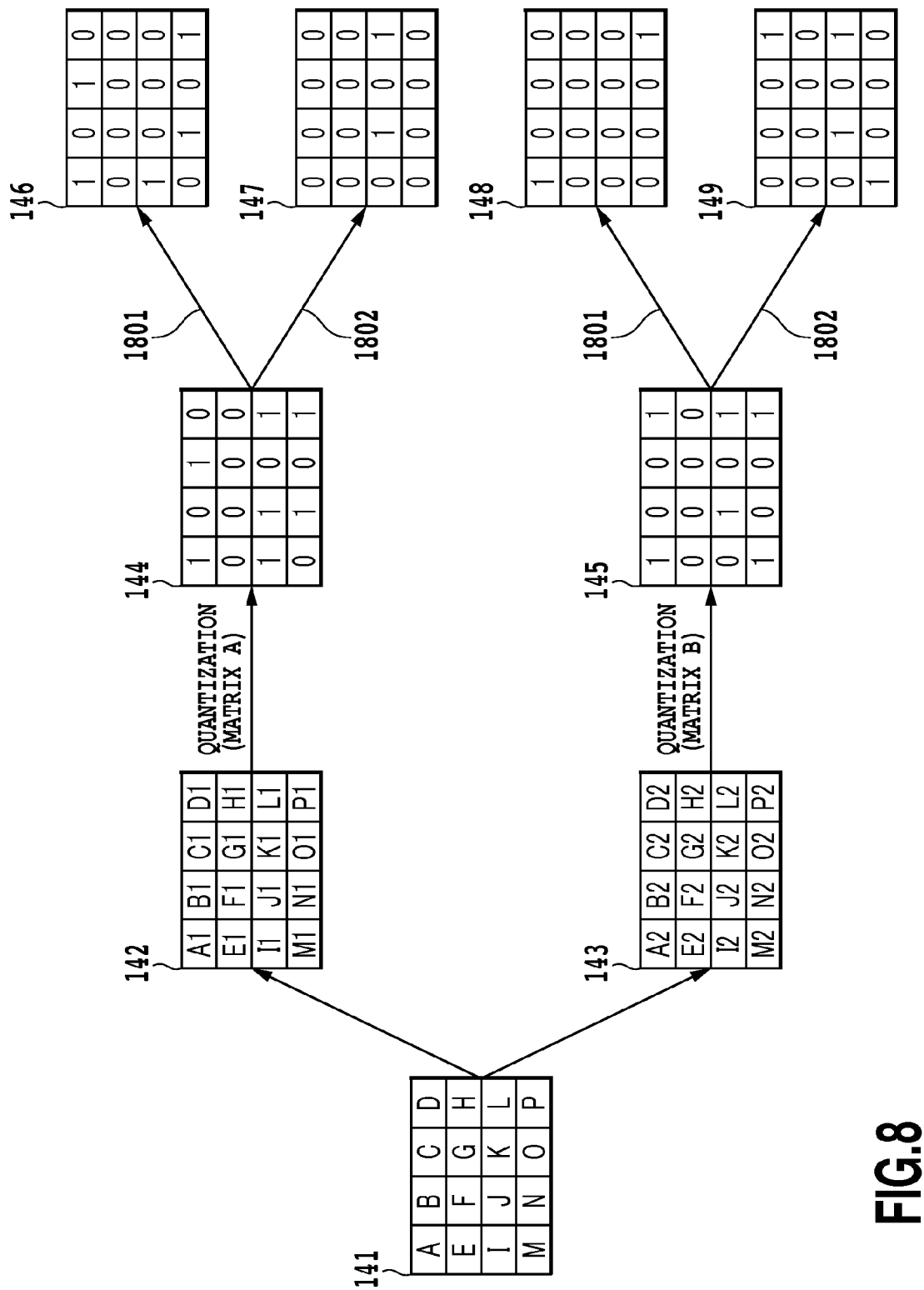
FIG. 8 is a schematic diagram for explaining a detailed example of the image processing illustrated in FIG. 3.

The image processing explained using FIG. 3 will be explained in more detail below using FIG. 8. FIG. 8 is an image of a detailed example of the image processing illustrated in FIG. 3. Here, the case is explained of processing input image data 141 that corresponds to 4 pixels×4 pixels for a total of 16 pixels. In the figure, reference codes A to P indicate combinations of RGB values of input image data 141 that correspond to each of the pixels. In addition, reference codes A1 to P1 indicate combinations of CMYK values of multi-value image data 142 for the first scan corresponding to each of the pixels. Also, reference codes A2 to P2 indicate combinations of CMYK values of multi-value image data 143 for the second scan corresponding to each of the pixels.

In the figure, the multi-value image data 142 for the first scan 192 corresponds to the multi-value data 64-1 for the first scan in FIG. 3, and multi-image data for the second scan 143 corresponds to the multi-value data 64-2 for the first scan. Moreover, quantized data 144 for the first scan corresponds to binary data 66-1 for the first scan, and quantized data 145 for the second scan corresponds to binary data 66-2 for the second scan. Furthermore, quantized data 146 for the first scan that corresponds to the first nozzle array corresponds to the binary data 68-1, and quantized data 147 for the first scan that corresponds to the second nozzle array corresponds to binary data 68-2. In addition, quantized data 148 for the second scan that corresponds of the first nozzle array corresponds to binary data 68-3, and quantized data 149 for the second scan that corresponds to the second nozzle array corresponds to binary data 68-4.

The input image data 191 (RGB data) for which analysis of the original image was performed by the image characteristic analysis/parameter setting unit 60 in FIG. 3 is inputted to the color conversion/image data division unit 62. The color conversion/image data division 62 uses a 3-dimensional LUT to generate multi-value image data 142 (CMYK) for the first scan and multi-value image data 143 (CMYK) for the second scan for each pixel from input image data 141 (RGB data). Here, the color conversion/image data division unit 62 uses a LUT that were set by the image characteristic analysis/parameter setting unit 60 for adjusting the dot overlap rate. By doing so, when the original image is a portrait, multi-value image data (142 and 143) are generated so that the bias of the two multi-value image data becomes relatively large. On the other hand, when the original image is something other than a portrait, multi-value image data (142 and 193) are generated so that the bias of the two multi-value image data becomes relatively small. The processing after this (gradation correction processing, quantization processing) is performed independently and simultaneously for each CMYK color, so for the convenience of explanation, the processing will be explained for only one color (K), and explanations for the other colors will be omitted.

The multi-value image data (192) for the first scan that is obtained as described above is inputted to the quantization processing unit 65-1 in FIG. 3 where it undergoes error-diffusion processing and is converted to quantized data (144) for the first scan. On the other hand, multi-image data (143) for the second scan is inputted to the second quantization processing unit 65-2 where it undergoes error-diffusion processing and is converted to quantized data (145) for the second scan. When doing this, when performing the error-diffusion processing on the multi-value image data 142 for the first scan, the error-diffusion matrix A illustrated in FIG. 9A is used, and when performing the error-diffusion processing on the multi-value image data 143 for the second scan, the error-diffusion matrix B illustrated in FIG. 9B is used. In the figure, of the quantized data (144, 145) for the first scan and second scan, data that is "1" is data for which a dot is printed (ink is discharged), and data that is "0" is data for which a dot is not printed (ink is not discharged).

Continuing, by dividing the quantized data 144 by using a mask, the first scan binary data division processing unit 67-1 generates quantized data 146 for the first scan that corresponds to the first nozzle array and quantized data 147 for the first scan that corresponds to the second nozzle array. More specifically, by filtering the quantized data 144 for the first scan using the mask 1801 in FIG. 5, quantized data 146 for the first scan that corresponds to the first nozzle array is obtained. Also, by filtering the quantized data 144 for the first scan using the mask 1802 in FIG. 5, quantized data 147 for the first scan that corresponds to the second nozzle array is obtained. The second scan binary data division processing unit 67-2 performs similar processing.

In this embodiment, binary data for the same scan and corresponding to two nozzle arrays is generated using two masks having a complementary relationship with each other, so dot overlap does not occur between nozzle arrays. Of course, it is possible to cause dot overlap to occur between nozzle arrays as well as between scans, however; when the color conversion/image data division unit generates multi-value data for a plurality of nozzle arrays×a plurality of scans, the number of data that become the object of quantization processing increases, and thus the data processing load becomes high. In addition, deviation of the printing position between nozzle arrays is less than deviation of the printing position between scans, so even though control of the dot overlap rate is not applied between nozzle arrays, it is difficult for the problem of density fluctuation to become obvious. For this reason, in this embodiment, multi-value data is generated for only the number of multipasses, and the dots are distributed between nozzle arrays by using masks having a complementary relationship.

In order to simplify the explanation, a method was explained in which the image characteristic is classified into two types, whether not the image is a portrait, and the dot overlap rate is controlled according to two parameters, However, the image characteristic analysis/parameter setting unit 60 can also classify the image characteristic into even more types. For example, in Japanese Patent Laid-Open No. 2005-063307, a method is disclosed in which an object such as "sky", "mountains", "ocean" is extracted from an image. Moreover, in Japanese Patent Laid-Open No. H05-003542 (1993), a method of discerning between "text" and "photographs" is disclosed. In this embodiment, the image characteristic of the overall image is determined according to the surface area occupied and the position of objects that are extracted using the methods disclosed in Japanese Patent Laid-Open No. 2005-063307 or Japanese Patent Laid-Open No. H05-003542 (1993), and thus it is possible to achieve an adequate dot overlap rate by using different parameters for each image characteristic.

With the embodiment explained above, in order to achieve a dot overlap rate that corresponds with the image characteristic of the original image, a plurality of density data that corresponds to different scan is generated according to the distribution rate corresponding to the image characteristic, and after that, binarization processing is executed for each of the multi-value data. By doing so, for example, it is possible to set the dot overlap rate of portrait images in which graininess stands out more than density unevenness due to deviation in the printing position, lower than the dot overlap rate of background images in which density unevenness due to deviation of the printing position stands out more than graininess. In other words, by making the dot overlap rate different for images having a characteristic in which density unevenness stands out more than graininess, and images having a characteristic in which graininess or other defects are taken into consideration more than density unevenness, it is possible to output good images for any kind of image characteristic.

Embodiment 2

In the first embodiment, a method was explained in which the color conversion/image data division unit adjusted the distribution rate in order to control the dot overlap rate. In this embodiment, the dot overlap rate is controlled by giving a feature to the quantization processing that is performed when quantizing the plurality of multi-value density data that is generated by the color conversion/image data division unit. When doing this, it is also possible to employ a method of controlling the dot overlap rate by the color conversion/image data division unit and quantization processing unit working together.

Figure 17:
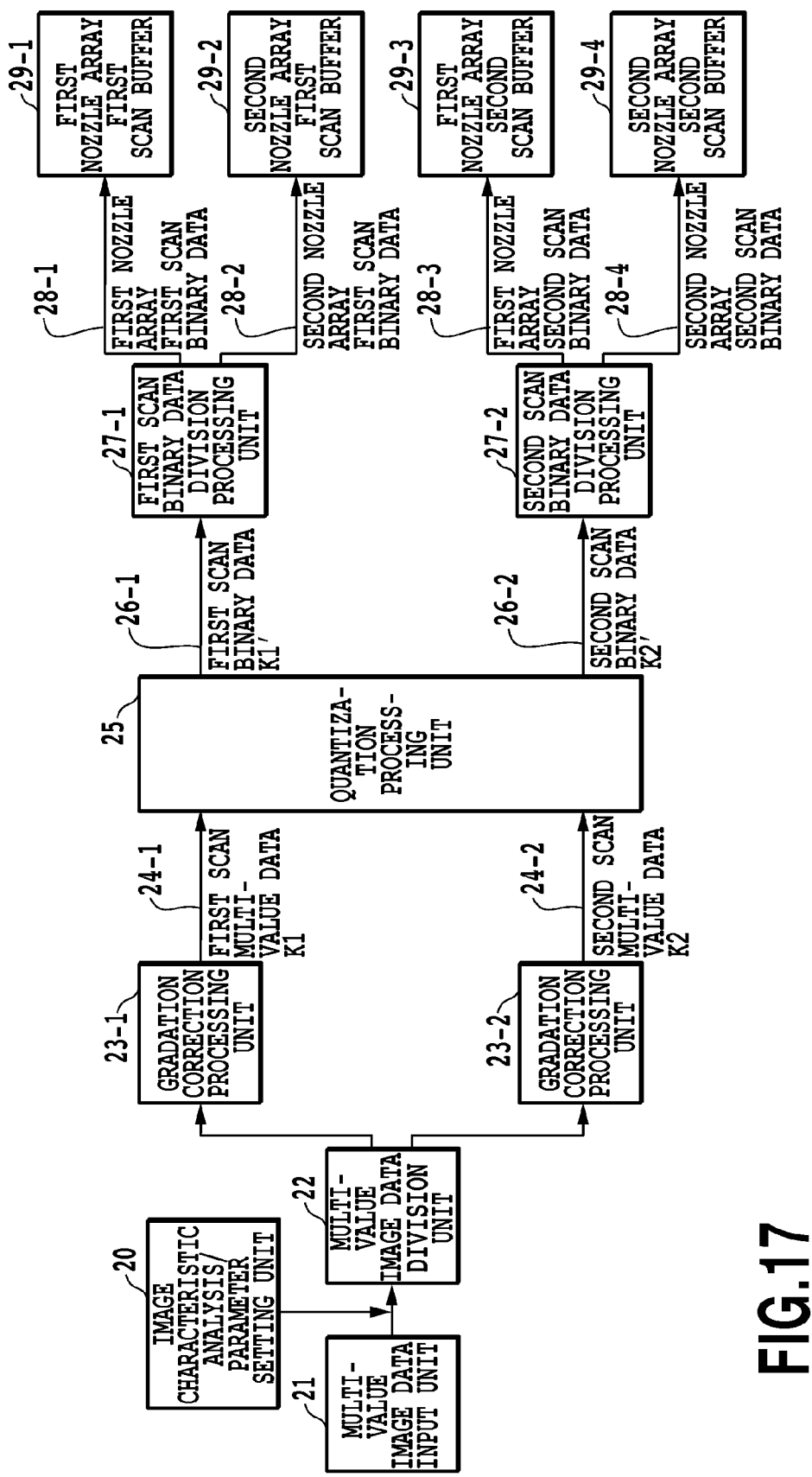
FIG. 17 is a block diagram for explaining steps of image processing of a second embodiment.

FIG. 17 is a block diagram for explaining the image processing when performing multipass printing to complete an image in the same area of a printing medium using two scans as illustrated in FIG. 7. Here, the processing from 21 to 25 in the figure is performed by the control unit 3000 as explained using FIG. 2 on image data that is inputted from an image input device such as a digital camera 3012, and the processing from 27 is performed by the printer engine 3004. In this way, the control unit 3000 comprises: a multi-value image data input unit 21, an image characteristic analysis/parameter setting unit 20, a color conversion/image data division unit 22, gradation correction processing units 23-1, 23-2 and a quantization processing unit 25 as shown in FIG. 17. On the other hand, the printer engine 3004 comprises binary data division processing units 27-1, 27-2.

Multi-value RGB image data (256 values) is inputted from an external device via the multi-value image data input unit 21. This inputted image data (original image) is then sent to the image characteristic analysis/parameter setting unit 20.

The image characteristic analysis/parameter setting unit 20 examines the entire original image, and analyzes whether the original image is a portrait (photograph of a person) or some other kind of image, and sets a parameter for adjusting the dot overlap rate according to the result in the memory 3003 as was explained using FIG. 2. Here, the parameter when the original image is a portrait is 2A, and the parameter when the image is something other than a portrait is 2B.

Multi-value image data (RGB data) for which the image characteristic has been set is inputted to the color conversion/image data division unit 22, which generates multi-value data for the first scan and multi-value data for the second scan at once, and the gradation correction processing units 23-1 and 23-2 perform gradation correction. In doing so, multi-value data 24-1 for the first scan and multi-value data 24-2 for the second scan are obtained. Here, the distribution rates may be uniform, or a plurality of density data (CMYK) that corresponds to different scans can be generated according to distribution rates that correspond to the image characteristic as in the embodiment described above.

After that, the gradation correction processing units 23-1 and 23-2 perform the same gradation correction processing as in the first embodiment. As a result, multi-value data 24-1 (C1, M1, Y1, K1) for the first scan, and multi-value data 24-2 (C2, M2, Y2, K2) for the second scan are obtained. The following processing is performed independently and simultaneously for cyan (C), magenta (M), yellow (Y) and black (K), so the explanation below will be just for the color black (K).

The quantization processing unit 25 performs binarization processing (quantization processing) on both the multi-value data 24-1 (K1) for the first scan and the multi-value data 24-2 (K2) for the second scan. Each of the multi-value data is converted (quantized) to either 0 or 1, to become binary data K1' (26-1) for the first scan and binary data K2' (26-2) for the second scan. When doing this, dots are overlapped and printed in pixels for which both K1' and K2' are 1, and no dots are printed in pixels for which both K1' and K2' are 0. Moreover, only one dot is printed in pixels for which only one of K1' and K2' is 1.

In this embodiment, a plurality of threshold value tables that are used for quantization are prepared in advance as illustrated in FIGS. 18A to 18G, and the quantization processing unit 25 sets one threshold value table from among the plurality of threshold value tables according to the parameter that was set in memory 3003. In addition, the quantization processing unit 25 uses the threshold value table that was set in this way to set threshold values to be used for each individual pixel, and executes quantization using these values.

Figure 11:
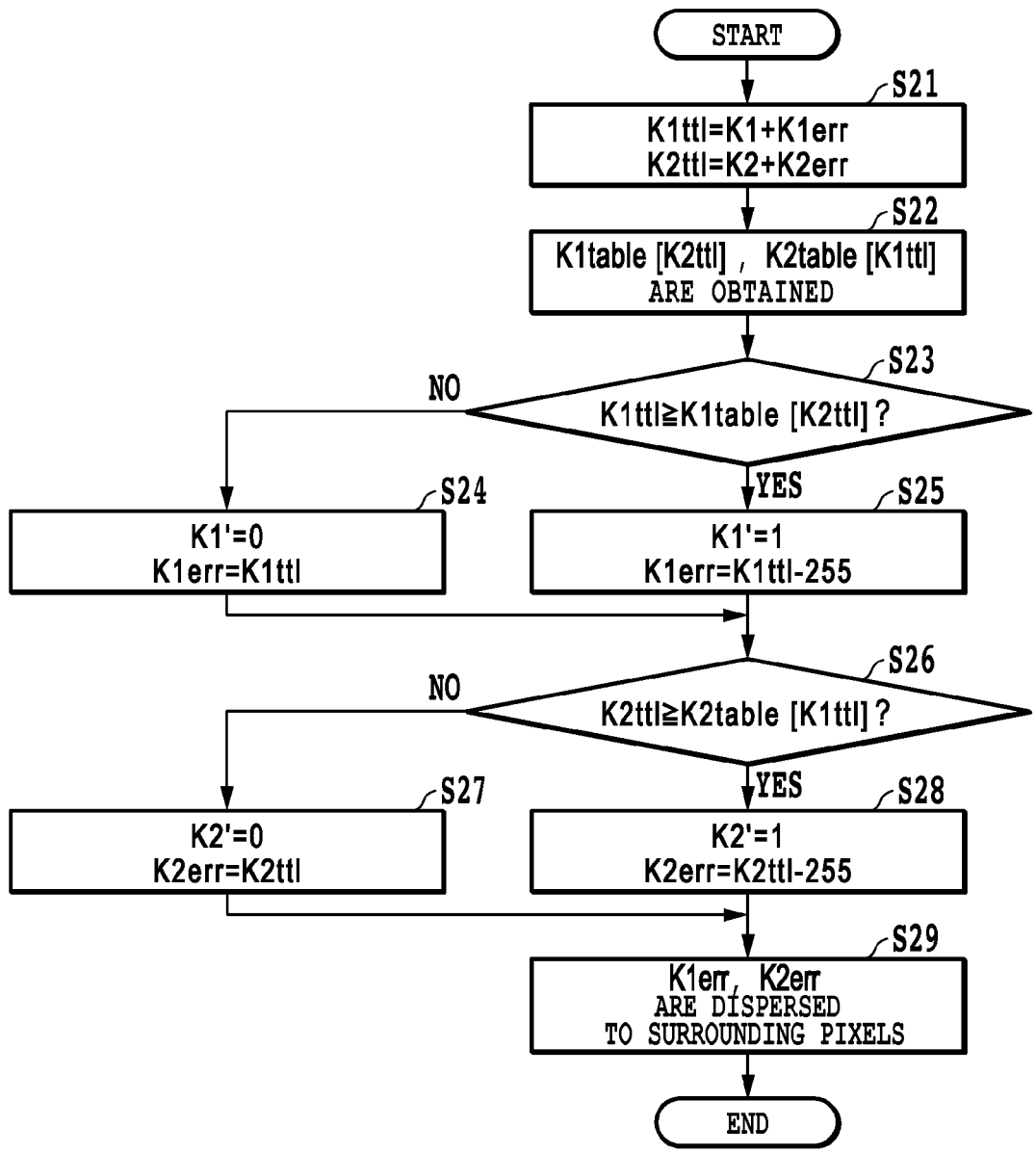
FIG. 11 is a flowchart for explaining the quantization method of a second embodiment.

The steps of the processing executed by the quantization processing 25 will be explained using the flowchart in FIG. 11. In this flowchart, K1 and K2 are inputted multi-value data for a pixel in question, and have values 0 to 255. The values K1err and K2err are accumulated error values that are generated from surrounding pixels for which quantization processing has already been performed, and values K1ttl and K2ttl are total values of the inputted multi-value data and accumulated error values. Furthermore, the values K1' and K2' are binary quantized data for the first printing scan and second printing scan.

In this processing, threshold values (quantized parameters) that are used when setting the binary quantized data values K1' and K2' differ according to the values K1ttl and K2ttl. For this construction, tables are prepared in advance from which the threshold values are primarily set according to the values K1ttl and K2ttl. Here, when setting the value K1', the threshold value for comparison with K1ttl is K1table [K2ttl], and when setting the value K2', the threshold value for comparison with K1ttl is K2table [K1ttl]. The value K1table [K2ttl] is a value that is set from the value K2ttl, and the value K2table [K1ttl] is a value that is set from the value K1ttl.

When this processing begins, first, in step S21, the values K1ttl and K2ttl are calculated. Next, in step S22, two threshold values K1table [K2ttl] and K2table [K1ttl] are obtained by referencing the threshold value table that was set according to the parameter, and from the values K1ttl and K2ttl that were found in step S21. The threshold value K1table [K2ttl] is primarily found by using K2ttl as a "reference value" in the threshold value table in Table 2. On the other hand, the threshold value K2table [K1ttl] is primarily set by using K1ttl as a "reference value" in the threshold value table in Table 2.

Continuing, in steps S23 to S25, the value K1' is set, and in steps S26 to S28, the value K2' is set. More specifically, in step S23, whether or not the value K1ttl that was calculated in step 21 is equal to or greater than the threshold value K1table [K2ttl] that was obtained in step S22 is determined. When it is determined that K1ttl is equal to or greater than the threshold value, K1'=1 is set, and the accumulated error value K1err (=K1ttl−255) is calculated and updated according to this output value (K1'=1) (step S25). On the other hand, when it is determined that K1ttl is less than the threshold value, K1'=0 is set, and the accumulated error value K1err (=K1ttl) is calculated and updated according to this output value (K1'=0) (step S24).

Next, in step S26, whether or not the value K2ttl that was calculated in step S21 is equal to or greater than the threshold value K2table [K1ttl] that was obtained in step S22 is determined. When it is determined that K2ttl is equal to or greater than the threshold value, K2'=1 is set, and the accumulated error value K2err (=K2ttl−255) is calculated and updated according to this output value (K2'=1) (step S28). On the other hand, when it is determined that K2ttl is less than the threshold value, K2'=0 is set, and the accumulated error value K2err (=K2ttl) is calculated and updated according to this output value (K2'=0) (step S27).

After that, in step S29, the accumulated error values K1err and K2err that were updated as described above, are diffused according to the error-diffusion matrix illustrated in FIGS. 9A and 9B into the surrounding pixels for which quantization processing has not yet been performed. In this embodiment, the error-diffusion matrix illustrated in FIG. 9A is used for diffusing the accumulated error value K1err into the surrounding pixels, and the error-diffusion matrix illustrated in FIG. 9B is used for diffusing the accumulated error value K2err into the surrounding pixels.

In this embodiment, the threshold value (quantized parameter) that is used for performing quantization processing on the multi-value data (K1ttl) that corresponds to the first scan is set based on the multi-value data (K2ttl) that corresponds to the second scan. Similarly, the threshold value (quantized parameter) that is used for performing quantization processing on the multi-value data (K2ttl) that corresponds to the second scan is set in based on the multi-value data (K1ttl) that corresponds to the first scan. In other words, quantization processing of multi-value data that corresponds to one scan of two scans and quantization processing of multi-value data that corresponds to the other scan of two scans is executed based on both the multi-value data that corresponds to the one scan and the multi-value data that corresponds to the other scan. By doing so, for example, it is possible to perform control so that dots are not printed during the other scan in pixels for which dots were printed during the one scan, so it is possible to keep graininess due to dot overlap from becoming worse.

Figure 18:
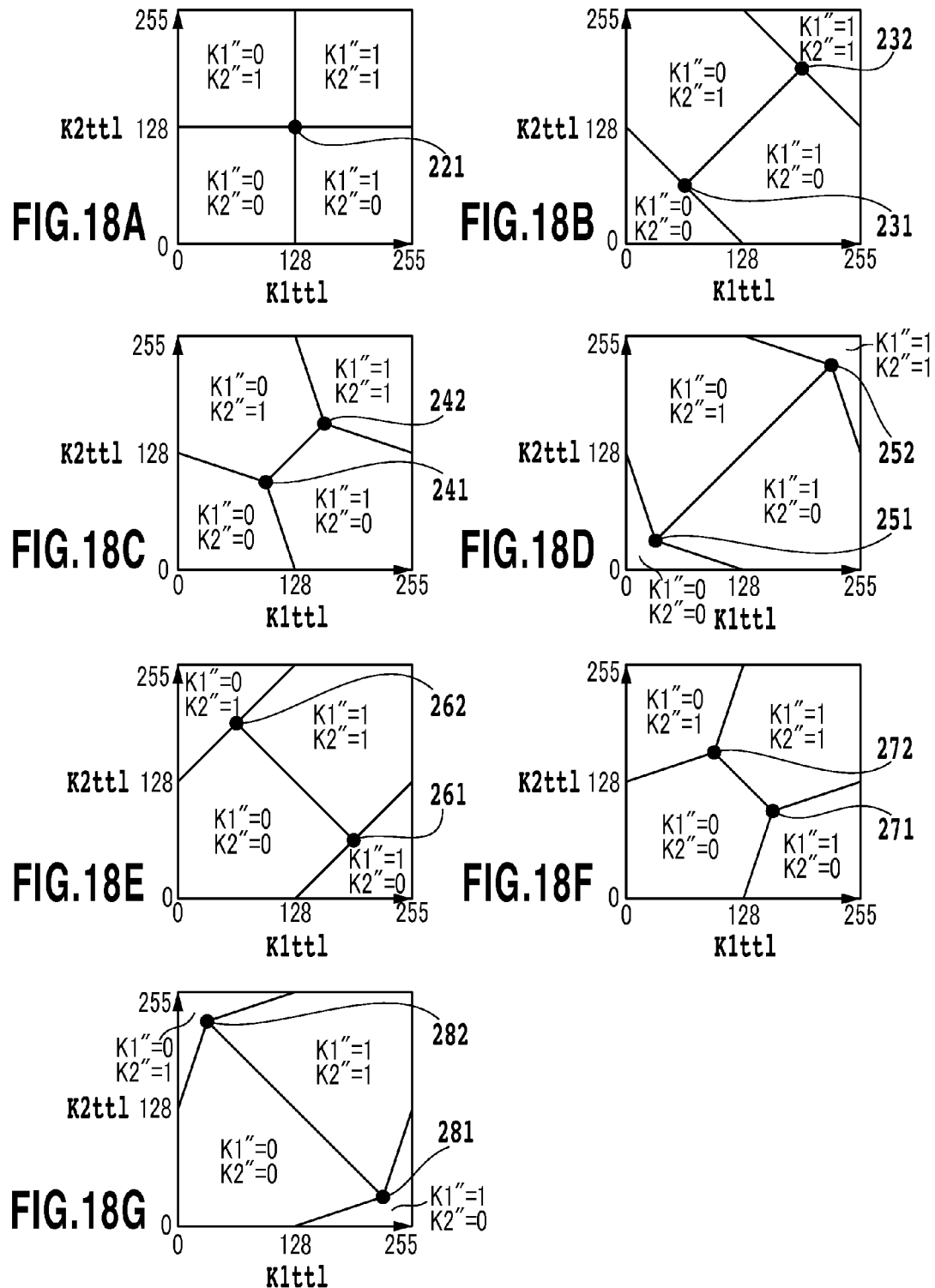
FIGS. 18A to 18G are diagrams that illustrate the correspondence between the results and input values of quantization processing that uses the threshold value table of Table 3.

FIG. 18A is a diagram for explaining the correlation between the results from performing quantization processing (binarization processing) according to the flowchart in FIG. 11 using threshold values that are given in the column for FIG. 18A in the threshold value table in Table 2 below and the inputted values (K1*ttl* and K2*ttl*). Both values K1*ttl* and K2*ttl* take on a value 0 to 255, and as illustrated in the column for FIG. 18A of the threshold value table, printing (1) and no printing (0) are set with the threshold value 128 as a border. The point 221 in the figure is the boundary point between the area where absolutely no dots are printed (K1'=0 and K2'=0), and the area where two dots overlap (K1'=1 and K2'=1).

FIG. 18B is a diagram for explaining the correlation between the results from performing quantization processing (binarization processing) according to the flowchart in FIG. 11 using threshold values that are given in the column for FIG. 18B in the threshold value table in Table 2 below and the input values (K1*ttl* and K2*ttl*). Point 231 is the border between the area where no dots are printed (K1'=0 and K2'=0) and the areas where only one dot is printed (K1'=1 and K2'=0, or K1'=0 and K2'=1). Point 232 is the boundary between the area where two dots overlap and are printed (K1'=1 and K2'=1) and the areas where only one dot is printed (K1'=1 and K2'=0, or K1'=0 and K2'=1). By separating the points 231 and 232 by a certain distance, the area where only one dot is printed increases when compared with the case shown in FIG. 18A, and the area where two dots are printed decreases. In other words, the case illustrated in FIG. 18B is effective in reducing the dot overlap rate more and keeping graininess lower than in the case illustrated in FIG. 18A. When there is a point such as in FIG. 18A where the dot overlap rate suddenly changes, density unevenness may occur due to small changes in the gradation, in the case illustrated in FIG. 18B, the dot overlap rate changes gradually as the gradation changes, so it is difficult for that kind of density unevenness to occur.

In the quantization processing of this embodiment, by setting various conditions for the relationship between the values K1*ttl* and K2*ttl* and the values K1 and K2, it is possible to make various adjustment of the values K1' and K2' and thus the dot overlap rate. In the following, some examples will be explained using FIGS. 18C to 18G. As in the case of FIG. 18A and FIG. 18B described above, FIGS. 18C to 18G are diagrams that illustrate the correlation between the quantization results (K1' and K2') using threshold values that are given in the threshold value table in Table 2 below and the inputted values (K1*ttl* and K2*ttl*).

FIG. 18C is a diagram illustrating the case in which the dot overlap rate is set to the value between the values in FIG. 18A and FIG. 18B. The point 241 is set at the mid point between point 221 in FIG. 18A and point 231 in FIG. 18B. Also, the point 242 is set at the mid point between the point 221 in FIG. 18A and point 232 in FIG. 18B.

FIG. 18D is a diagram illustrating the case in which the dot overlap rate is decreased even more than in the case illustrated in FIG. 18B. Point 251 is set at a point that externally divides point 221 in FIG. 18A and point 231 in FIG. 18B by 3:2. Moreover, the point 252 is set at a point that externally divides point 221 in FIG. 18A and point 232 in FIG. 18B by 3:2.

FIG. 18E illustrates the case in which the dot overlap rate is increased more than that illustrated in FIG. 18A. In the case illustrated in FIG. 18E, the transition from the area where no dots are printed (K1'=0 and K2'=0) to the area where two dots overlap and are printed (K1'=1 and K2'=1) occurs easily, and it is possible to increase the dot overlap rate. FIG. 18F is a diagram that illustrates the case in which the dot overlap rate is between that of the case illustrated in FIG. 18A and the case illustrated in FIG. 18E. FIG. 18G illustrates the case in which the dot overlap rate is further increased more than the case illustrated in FIG. 18E.

Next, the quantization processing method that uses the threshold value table that is illustrated in Table 2 will be explained in detail. Table 2 is a threshold value table for achieving the processing results illustrated in FIGS. 18A to 18G, and referenced at step S22 of the flowchart explained using FIG. 11.

Here, the case will be explained in which the input values (K1*ttl*, K2*ttl*) are (100, 120), and the threshold values that are given in the column for FIG. 18B of the threshold value table are used. First, in step S22 in FIG. 11, the threshold value K1table [K2*ttl*] is found based on the threshold value table illustrated in Table 2 and the value K2*ttl* (reference value). When the reference value (K2*ttl*) is '120', the threshold value K1table [K2*ttl*] becomes '120'. Similarly, the threshold value K2table [K1*ttl*] is found based on the threshold value table and the value K1*ttl* (reference value). When the reference value (K1*ttl*) is '100', the threshold value K2table [K1*ttl*] becomes '101'. Next, in step S23 in FIG. 11, K1*ttl* is compared with the threshold value K1table [K2*ttl*], and in this case, K1*ttl* (=100)<threshold value K1table [K2*ttl*] (=120), so K1'=0 (step S24). Similarly, in step S26 in FIG. 11, K2*ttl* is compared with the threshold value K2table [K1*ttl*], and in this case, K2*ttl* (=120)≥threshold value K2table [K1*ttl*] (=101), so K2'=1 (step S28). As a result, as illustrated in FIG. 18B, when (K1*ttl*, K2*ttl*)=(100, 120), (K1', K2')=(0, 1).

With this kind of quantization processing, the dot overlap rate is controlled between two scans by quantizing the multi-value data that corresponds to two scans based on both of the multi-value data that corresponds to the two scans. By doing so, the overlap rate of the dots printed in one scan and the dots printed in the other scan can be kept within a preferable range, and it is possible to achieve both suppressed density unevenness and low graininess. In Table 2, the reference values are given in increments of 4, however; in an actual table, threshold values are also prepared for the values (for example, 1 to 3) between these values as well. However, for the reference values, it is possible to prepare skipping values as illustrated in Table 2, and for conversion of other values, find the value by performing interpolation from the closest reference values to the value.

Here, the threshold value tables in FIGS. 18A to 18G are arranged in the order of lowest dot overlap rate; D, B, C, A, F, E and G. Therefore, in this embodiment, when the image characteristic of the original image is a portrait, for example, by using the threshold value table in FIG. 18D, and when the image characteristic is a photograph of scenery, by using the threshold value table in FIG. 18E, it is possible to keep the dot overlap rate of a portrait image lower than that of a photograph of scenery. In order to simplify the explanation above, the method of controlling the dot overlap rate for a portrait and image characteristic other than a portrait, or in other words, for two kinds of image characteristics was explained, however; of course the types of image characteristics in this embodiment are not limited to this. It is possible to classify various image characteristics such as a portrait, photograph of scenery, graphics, text images and the like, then set different threshold value tables from among those of FIGS. 18A to 18G for each respective characteristic and obtain a suitable dot overlap rate for each.

TABLE 2

| 参照値 | FIG. 18A | | FIG. 18B | | FIG. 18C | | FIG. 18D | | FIG. 18E | | FIG. 18F | | FIG. 18G | |
|---|---|---|---|---|---|---|---|---|---|---|---|---|---|---|
| | K1 table | K2 table | K1 table | K2 table | K1 table | K2 table | K1 table | K2 table | K1 table | K2 table | K1 table | K2 table | K1 table | K2 table |
| 0 | 128 | 128 | 128 | 128 | 128 | 128 | 128 | 128 | 127 | 127 | 127 | 127 | 127 | 127 |
| 4 | 128 | 128 | 124 | 124 | 126 | 126 | 116 | 116 | 131 | 131 | 129 | 129 | 139 | 139 |
| 8 | 128 | 128 | 120 | 120 | 125 | 125 | 104 | 104 | 135 | 135 | 130 | 130 | 151 | 151 |
| 12 | 128 | 128 | 116 | 116 | 124 | 124 | 92 | 92 | 139 | 139 | 131 | 131 | 163 | 163 |
| 16 | 128 | 128 | 112 | 112 | 122 | 122 | 80 | 80 | 143 | 143 | 133 | 133 | 175 | 175 |
| 20 | 128 | 128 | 108 | 108 | 121 | 121 | 68 | 68 | 147 | 147 | 134 | 134 | 187 | 187 |
| 24 | 128 | 128 | 104 | 104 | 120 | 120 | 56 | 56 | 151 | 151 | 135 | 135 | 199 | 199 |
| 28 | 128 | 128 | 100 | 100 | 118 | 118 | 44 | 44 | 155 | 155 | 137 | 137 | 211 | 211 |
| 32 | 128 | 128 | 96 | 96 | 117 | 117 | 32 | 33 | 159 | 159 | 138 | 138 | 223 | 222 |
| 36 | 128 | 128 | 92 | 92 | 116 | 116 | 36 | 37 | 163 | 163 | 139 | 139 | 219 | 218 |
| 40 | 128 | 128 | 88 | 88 | 114 | 114 | 40 | 41 | 167 | 167 | 141 | 141 | 215 | 214 |
| 44 | 128 | 128 | 84 | 84 | 113 | 113 | 44 | 45 | 171 | 171 | 142 | 142 | 211 | 210 |
| 48 | 128 | 128 | 80 | 80 | 112 | 112 | 48 | 49 | 176 | 175 | 143 | 143 | 207 | 206 |
| 52 | 128 | 128 | 76 | 76 | 110 | 110 | 52 | 53 | 179 | 179 | 145 | 145 | 203 | 202 |
| 56 | 128 | 128 | 72 | 72 | 109 | 109 | 56 | 57 | 183 | 183 | 146 | 146 | 199 | 198 |
| 60 | 128 | 128 | 68 | 68 | 108 | 108 | 60 | 61 | 187 | 187 | 147 | 147 | 195 | 194 |
| 64 | 128 | 128 | 64 | 65 | 106 | 106 | 64 | 65 | 191 | 190 | 148 | 148 | 191 | 190 |
| 68 | 128 | 128 | 68 | 69 | 105 | 105 | 68 | 69 | 187 | 186 | 150 | 150 | 187 | 186 |
| 72 | 128 | 128 | 72 | 73 | 104 | 104 | 72 | 73 | 183 | 182 | 151 | 151 | 183 | 182 |
| 76 | 128 | 128 | 76 | 77 | 102 | 102 | 76 | 77 | 179 | 178 | 153 | 153 | 179 | 178 |
| 80 | 128 | 128 | 80 | 81 | 101 | 101 | 80 | 81 | 175 | 174 | 154 | 154 | 175 | 174 |
| 84 | 128 | 128 | 84 | 85 | 100 | 100 | 84 | 85 | 171 | 170 | 155 | 155 | 171 | 170 |
| 88 | 128 | 128 | 88 | 89 | 98 | 98 | 88 | 89 | 167 | 166 | 157 | 157 | 167 | 166 |
| 92 | 128 | 128 | 92 | 93 | 97 | 97 | 92 | 93 | 163 | 162 | 158 | 158 | 163 | 162 |
| 96 | 128 | 128 | 96 | 97 | 96 | 97 | 96 | 97 | 159 | 158 | 159 | 158 | 159 | 158 |
| 100 | 128 | 128 | 100 | 101 | 100 | 101 | 100 | 101 | 155 | 154 | 155 | 154 | 155 | 154 |
| 104 | 128 | 128 | 104 | 105 | 104 | 105 | 104 | 105 | 151 | 150 | 151 | 150 | 151 | 150 |
| 108 | 128 | 128 | 108 | 109 | 108 | 109 | 108 | 109 | 147 | 146 | 147 | 146 | 147 | 146 |
| 112 | 128 | 128 | 112 | 113 | 112 | 113 | 112 | 113 | 143 | 142 | 143 | 142 | 143 | 142 |
| 116 | 128 | 128 | 116 | 117 | 116 | 117 | 116 | 117 | 139 | 138 | 139 | 138 | 139 | 138 |
| 120 | 128 | 128 | 120 | 121 | 120 | 121 | 120 | 121 | 135 | 134 | 135 | 134 | 135 | 134 |
| 124 | 128 | 128 | 124 | 125 | 124 | 125 | 124 | 125 | 131 | 130 | 131 | 130 | 131 | 130 |
| 128 | 128 | 128 | 128 | 129 | 128 | 129 | 128 | 129 | 127 | 126 | 127 | 126 | 127 | 126 |
| 132 | 128 | 128 | 132 | 133 | 132 | 133 | 132 | 133 | 123 | 122 | 123 | 122 | 123 | 122 |
| 136 | 128 | 128 | 136 | 137 | 136 | 137 | 136 | 137 | 119 | 118 | 119 | 118 | 119 | 118 |
| 140 | 128 | 128 | 140 | 141 | 140 | 141 | 140 | 141 | 115 | 114 | 115 | 114 | 115 | 114 |
| 144 | 128 | 128 | 144 | 145 | 144 | 145 | 144 | 145 | 111 | 110 | 111 | 110 | 111 | 110 |
| 148 | 128 | 128 | 148 | 149 | 148 | 149 | 148 | 149 | 107 | 106 | 107 | 106 | 107 | 106 |
| 152 | 128 | 128 | 152 | 153 | 152 | 153 | 152 | 153 | 103 | 102 | 103 | 102 | 103 | 102 |
| 156 | 128 | 128 | 156 | 157 | 156 | 157 | 156 | 157 | 99 | 98 | 99 | 98 | 99 | 98 |
| 160 | 128 | 128 | 160 | 161 | 157 | 158 | 160 | 161 | 95 | 94 | 97 | 97 | 94 | 95 |
| 164 | 128 | 128 | 164 | 165 | 159 | 159 | 164 | 165 | 91 | 90 | 96 | 96 | 91 | 90 |
| 168 | 128 | 128 | 168 | 169 | 157 | 157 | 168 | 169 | 87 | 86 | 98 | 98 | 87 | 86 |
| 172 | 128 | 128 | 172 | 173 | 156 | 156 | 172 | 173 | 83 | 82 | 99 | 99 | 83 | 82 |
| 176 | 128 | 128 | 176 | 177 | 155 | 155 | 176 | 177 | 79 | 78 | 100 | 100 | 79 | 78 |
| 180 | 128 | 128 | 180 | 181 | 153 | 153 | 180 | 181 | 75 | 74 | 102 | 102 | 75 | 74 |
| 184 | 128 | 128 | 184 | 185 | 152 | 152 | 184 | 185 | 71 | 70 | 103 | 103 | 71 | 70 |
| 188 | 128 | 128 | 188 | 189 | 151 | 151 | 188 | 189 | 67 | 66 | 104 | 104 | 67 | 66 |
| 182 | 128 | 128 | 191 | 191 | 149 | 149 | 192 | 193 | 64 | 64 | 106 | 106 | 63 | 62 |
| 196 | 128 | 128 | 187 | 187 | 148 | 148 | 196 | 197 | 68 | 68 | 107 | 107 | 59 | 58 |
| 200 | 128 | 128 | 183 | 183 | 147 | 147 | 200 | 201 | 72 | 72 | 108 | 108 | 55 | 54 |
| 204 | 128 | 128 | 179 | 179 | 145 | 145 | 204 | 205 | 76 | 76 | 110 | 110 | 51 | 50 |
| 208 | 128 | 128 | 175 | 175 | 144 | 144 | 208 | 209 | 80 | 80 | 111 | 111 | 47 | 46 |
| 212 | 128 | 128 | 171 | 171 | 143 | 143 | 212 | 213 | 84 | 84 | 112 | 112 | 43 | 42 |
| 216 | 128 | 128 | 167 | 167 | 141 | 141 | 216 | 217 | 88 | 88 | 114 | 114 | 39 | 38 |
| 220 | 128 | 128 | 163 | 163 | 140 | 140 | 220 | 221 | 92 | 92 | 115 | 115 | 35 | 34 |
| 224 | 128 | 128 | 159 | 159 | 139 | 139 | 222 | 222 | 96 | 96 | 116 | 116 | 33 | 33 |
| 228 | 128 | 128 | 155 | 155 | 137 | 137 | 210 | 210 | 100 | 100 | 118 | 118 | 45 | 45 |
| 232 | 128 | 128 | 151 | 151 | 136 | 136 | 198 | 198 | 104 | 104 | 119 | 119 | 57 | 57 |
| 226 | 128 | 128 | 147 | 147 | 135 | 135 | 186 | 186 | 108 | 108 | 120 | 120 | 69 | 69 |
| 240 | 128 | 128 | 143 | 143 | 133 | 133 | 174 | 174 | 112 | 112 | 122 | 122 | 81 | 81 |
| 244 | 128 | 128 | 139 | 139 | 132 | 132 | 162 | 162 | 116 | 116 | 123 | 123 | 93 | 93 |
| 248 | 128 | 128 | 135 | 135 | 131 | 131 | 150 | 150 | 120 | 120 | 124 | 124 | 105 | 105 |
| 252 | 128 | 128 | 131 | 131 | 129 | 129 | 138 | 138 | 124 | 124 | 126 | 126 | 117 | 117 |
| 255 | 128 | 128 | 128 | 128 | 129 | 129 | 129 | 129 | 127 | 127 | 126 | 126 | 126 | 126 |

Again, returning to FIG. 17, after obtaining the binary image data K1' and K2' for achieving the desired dot overlap rate as described above from the quantization processing unit 25, these data are sent via the IEEE 1289 bus 3022 to the printer engine 3009 illustrated in FIG. 2. The processing after that is executed by the printer engine 3004.

In the printer engine 3004, the binary image data K1' (26-1) and K2' (26-2) is divided into binary data to be printed by two nozzle arrays 54 and 55, respectively. In other words, the binary image data for the first scan K1' (26-1) is divided by a first scan binary data division processing unit 27-1 into binary data 28-1 for the first scan by the first nozzle array and binary data 28-2 for the first scan by the second nozzle array. Moreover, the binary image data K2' (26-2) for the second scan is divided by a second scan binary data division unit 27-2 into binary data 28-3 for the second scan by the first nozzle array and binary data 28-4 for the second scan by the second nozzle array. These processing methods are the same as in the first embodiment. After that, each binary image data (28-1 to 4) is stored in buffers that are prepared for each corresponding scan of the corresponding nozzle array. After the necessary amount of binary image data is stored in each respective buffer, the printing operation is executed according to the stored data by the corresponding scan and nozzle array.

In this embodiment, as in the first embodiment, it is possible to apply dot overlap control not only between scans, but also between nozzle arrays. However, when applying dot overlap rate control between nozzle arrays as well, the number of data that become the object of quantization increases, so the data processing load becomes large. Therefore, in this embodiment, dot overlap control is applied only between scans, and dot overlap control is not applied between nozzle arrays.

Above, examples are given of 2-pass printing, however; in an actual printer, normally a plurality of printing modes are prepared having different number of multipasses, and in this embodiment as well, it is possible to achieve the desired dot overlap rate by various multipasses. In other words, in this embodiment, the method of controlling the dot overlap rate can be applied to 3-pass or more M (M is an integer 2 or greater) pass printing.

In the case of M-pass printing, the number of multi-value density data that are generated by the color conversion/image data division unit 22 in FIG. 17 is M. In other words, by referencing a 3-dimensional LUT that correlates the inputted image data (RGB) with multi-value density data that corresponds to M number of passes, multi-value image data is generated from inputted image data at once. Together with that, the quantization processing unit 25 obtains threshold values by referencing a prepared threshold value table using first multi-value data to Mth multi-value data as references for each of M number of multi-value data, or in other words, first multi-value data to Mth multi-value data. In addition, the quantization processing unit 25 performs quantization processing using the obtained threshold values, and outputs M number of binary data.

As explained above, with this embodiment, a plurality of density data that corresponds to the number of multipasses is generated, and after that, in order to obtain a dot overlap rate for each density data that corresponds to each image characteristic, suitable threshold values are set and binarization is executed. By doing so, it is possible to set the dot overlap rate of portrait images in which graininess stands out more than density unevenness due to deviation of the printing position such that it is lower than the dot overlap rate of scenery images in which the density unevenness due to deviation of the printing position stands out more than graininess. In other words, by making the dot overlap rates different for images in which the density unevenness stands out more than graininess, and for images in which graininess and other defects are taken into consideration more than density unevenness, it is possible to output good images for any kind of image characteristic.

Variation of Embodiment 2

The quantization method for achieving the desired dot overlap rate is not limited to that described above. It is not absolutely necessary to set printing (1) and no printing (0) through comparison with threshold values. For example, in the case of two planes, a 2-dimensional table could also be prepared in which the values K1' and K2' are primarily set to printing (1) or no printing (0) by using both K1*ttl* and K2*ttl* as reference values. Moreover, in the case of three planes, a 3-dimensional table could also be prepared in which the values K1', K2' and K3' are primarily set by using K1*ttl*, K2*ttl* and K3*ttl* as reference values.

Details about the tables are omitted, however; using multi-dimensional tables such as these has merit in that control becomes simpler, and the dot overlap rate can be controlled with a high degree of freedom. On the other hand, using a 1-dimensional threshold value table as illustrated in Table 2 has merit in that a table can be created that uses less memory space.

Furthermore, it is also possible to perform binarization (quantization) by just branching and calculation without using a table. In that case, by setting the coefficients that are used in the calculations to values that make it possible to achieve the desired dot overlap rate, the effect of this embodiment can be obtained. In such a case, it is possible to further reduce the amount of memory space (used ROM size or RAM size) used when compared with the case in which a table as described above is prepared.

Embodiment 3

In recent years, most image processing is performed at a lower (rougher) resolution than the printing resolution, and a form is used in which image data is sent to the printer engine of the printer with the multi-value image data converted to L-value (L is 3 or greater) data that has a lower gradation than 256-gradation image data. In this case, the printer engine comprises a dot pattern (index pattern) that is stored in memory for converting the received low-gradation L-value data to binary data that corresponds to the printing resolution.

In the following, an example of 3-value quantization is explained as the L-value quantization, however; needless to say, the value of L can be a value that is 3 or greater. Moreover, in the explanation below, as in the embodiments described above, the method for controlling the dot overlap rate will be explained for 2-pass multipass printing as an example, however; of course this embodiment as well, can correspond to a plurality of printing modes having a number of multipasses other than 2.

Figure 19:
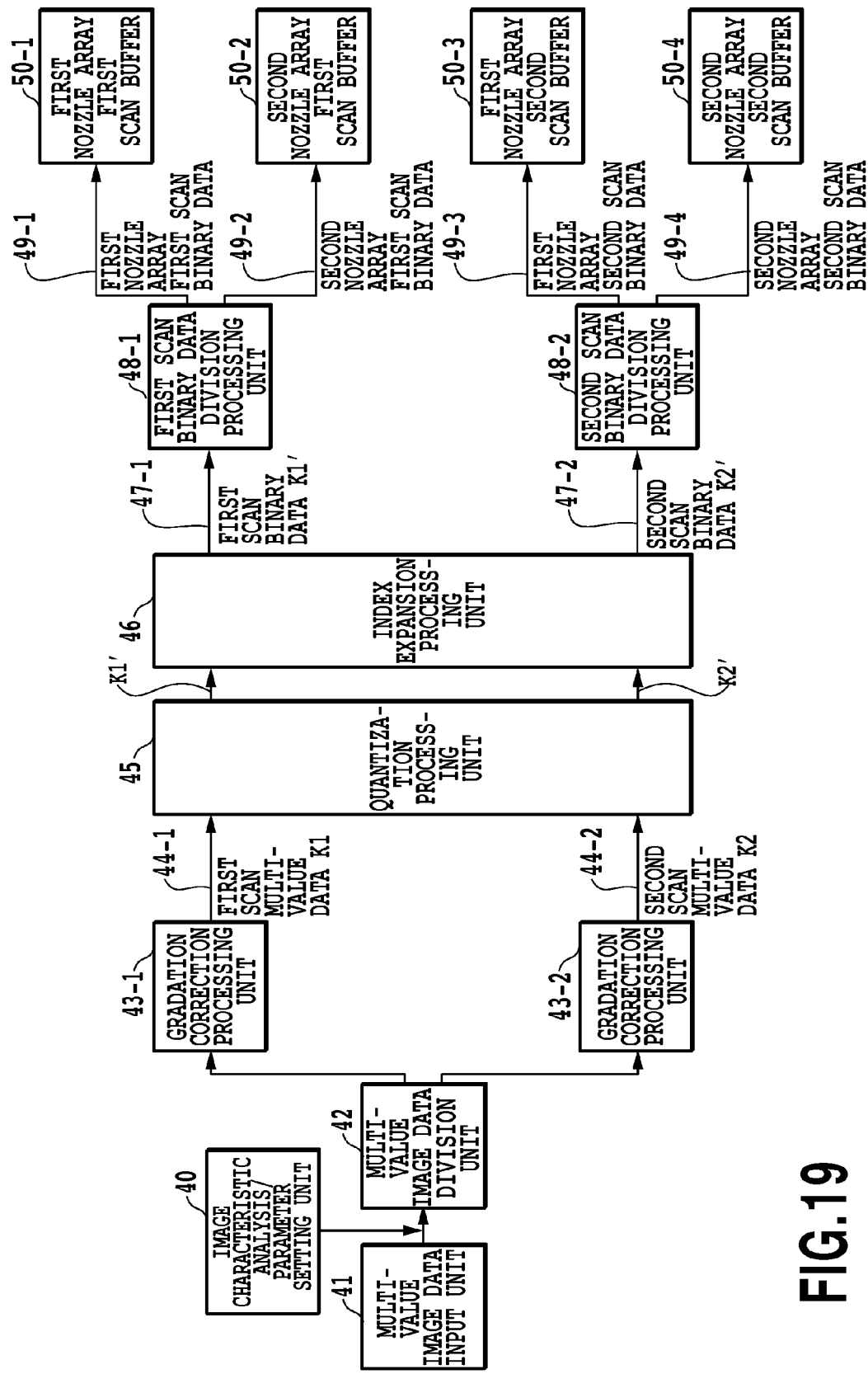
FIG. 19 is a block diagram for explaining steps of image processing of a third embodiment.

FIG. 19 is a block diagram for explaining the image processing of this embodiment for the case in which multipass printing is performed to complete an image in the same area (for example, pixel area) by two printing scans. The processing by the multi-value image data input unit 41 to the gradation correction processing unit 43 is mainly equivalent to the processing by the multi-value image data input unit to gradation correction processing unit illustrated in FIG. 3 and FIG. 17.

Multi-image data (K1) 44-1 for the first scan and multi-value data (K2) 94-2 for the second scan are inputted to the quantization processing unit 45. The quantization processing unit 45 quantizes the multi-value data (K1) for the first scan and multi-value data (K2) for the second scan to the three values 0 to 2, to generate quantized data (K1') for the first scan and quantized data (K2') for the second scan. More specifically, as in the quantization process that is performed by the quantization processing unit 25 of the second embodiment, first K1*ttl* and K2*ttl* are obtained by adding accumulating value of the surround error to K1 and K2. After that, the threshold values that are used when quantizing the multi-value data (K1) for the first scan are set based on K2*ttl*, and the threshold values that are used when quantizing the multi-value data (K2) for the second scan are set based on K1*ttl*. In addition, in the case of M-pass printing, the threshold values that are used when quantizing the multi-value data (Ki) for the ith scan is set based on K1*ttl* to K(i−1)ttl and K(i+1) to KMttl.

In the case of this embodiment, 3-value quantization is performed, so two threshold values, that is a first threshold value and a second threshold value that is greater than the first threshold value are used. Moreover, for the pixel in question, the output values are set according to the size relationship between a total value of the input multi-value data and the accumulated error values, (K1*ttl* and K2*ttl*) and the first and second threshold values. In other words, when the total value is equal to or greater than the second threshold value, the output value becomes "2", and when the total value is equal to or greater than the first threshold value and less than the second threshold value, the output value becomes "1", and when the total value is less than the first threshold value, the output value becomes "0".

In this way, the multi-value data (K1) for the first scan is quantized using threshold value which is set based on K2*ttl* to obtain the quantized data (K1') for the first scan. Similarly, the multi-value data (K2) for the second scan is quantized using threshold value which is set based on KMttl to obtain the quantized data (K2') for the second scan. In the case of M-pass printing, the multi-value data (Ki) for the ith scan is quantized using threshold values that is set based on K1*ttl* to K(i−1)ttl and K(i+1) to KMttl to obtain quantized data (K1') for the ith scan. For setting the first threshold value and second threshold value it is effective that the first threshold value tables and second threshold value tables are determined respectively by using the same reference values, as in the example of binarization.

Figure 14:
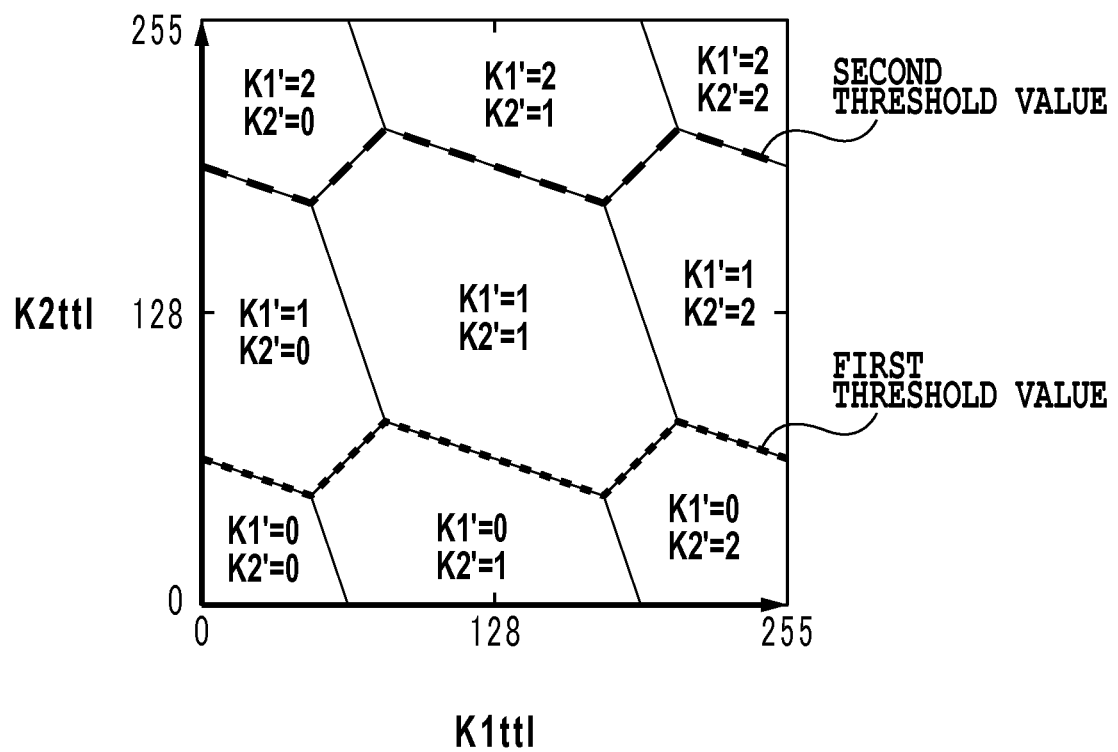
FIG. 14 is a diagram that illustrates the correspondence between the results and input values of 3-value quantization processing.

FIG. 14 is a diagram similar to FIGS. 18A to 18G that illustrates the correlation between the quantization (3-value quantization) results (K1 and K2) by the quantization processing unit 45 and the inputted values (KMttl and K2*ttl*). In FIG. 14, the values K1' and K2' indicate the number of dots that will be printed in the pixel in question in the first printing scan and second printing scan. Here, the first threshold value that is used for quantizing K2*ttl* is indicated by the thick dotted line, and the second threshold value is indicated by the thick dashed line.

For example, two dots each are printed in the first printing scan and second printing scan in the pixel in question when both K1' and K2' are 2. One dot is printed in the first printing scan and two dots are printed in the second printing scan in the pixel in question when K1' Is 1 and K2' is 2. No dots are printed in the pixel in question when both K1' and K2' are 0. FIG. 14 is a diagram that explains quantization in the case of 2-pass printing, and is illustrated in two dimensions with K1*ttl* and K2*ttl* being the coordinate axes, however; in the case of M-pass printing, the diagram is then illustrated in M dimensions with K1*ttl* to KMttl being the coordinate axes.

Referring again to FIG. 19, the quantization processing unit 45 sends the quantized 3-value image data (quantized data) K1' and K2' to the printer engine 3004, where index processing is performed by an index expansion processing unit 46. The index expansion process is a process for binarizing L-value (L is an integer 3 or greater) quantized data and can be taken to be part of the quantization process. This index expansion process will be explained in detail below.

The index expansion processing unit 46 converts the 3-value image data K1' to binary image data 47-1 for the first scan, and converts the 3-value image data K2' to binary data 97-2 for the second scan. After that, a first scan binary data division unit 98-1 divides the binary data 47-1 for the first scan into binary data 49-1 for the first scan by the first nozzle array and binary data 49-2 for the first scan by the second nozzle array. Similarly, a second scan binary data division unit 48-2 divides the binary image data 47-2 for the second scan into binary data 49-3 for the second scan by the first nozzle array and binary data for the 49-4 for the second scan by the second nozzle array. In the case of M-pass printing, an ith scan binary data division unit 48-*i* divides binary image data for the ith scan into binary data for the ith scan by the first nozzle array and binary data for the ith scan by the second nozzle array. This division processing is the same as in the first embodiment, and is executed by using masks. Moreover, these four kinds of binary data (49-1 to 4) are stored in corresponding buffers (50-1 to 4). After that, when a specified amount of binary data has been stored in each individual buffer, the printing operation is executed according to the data stored in the corresponding buffers.

Figure 15:
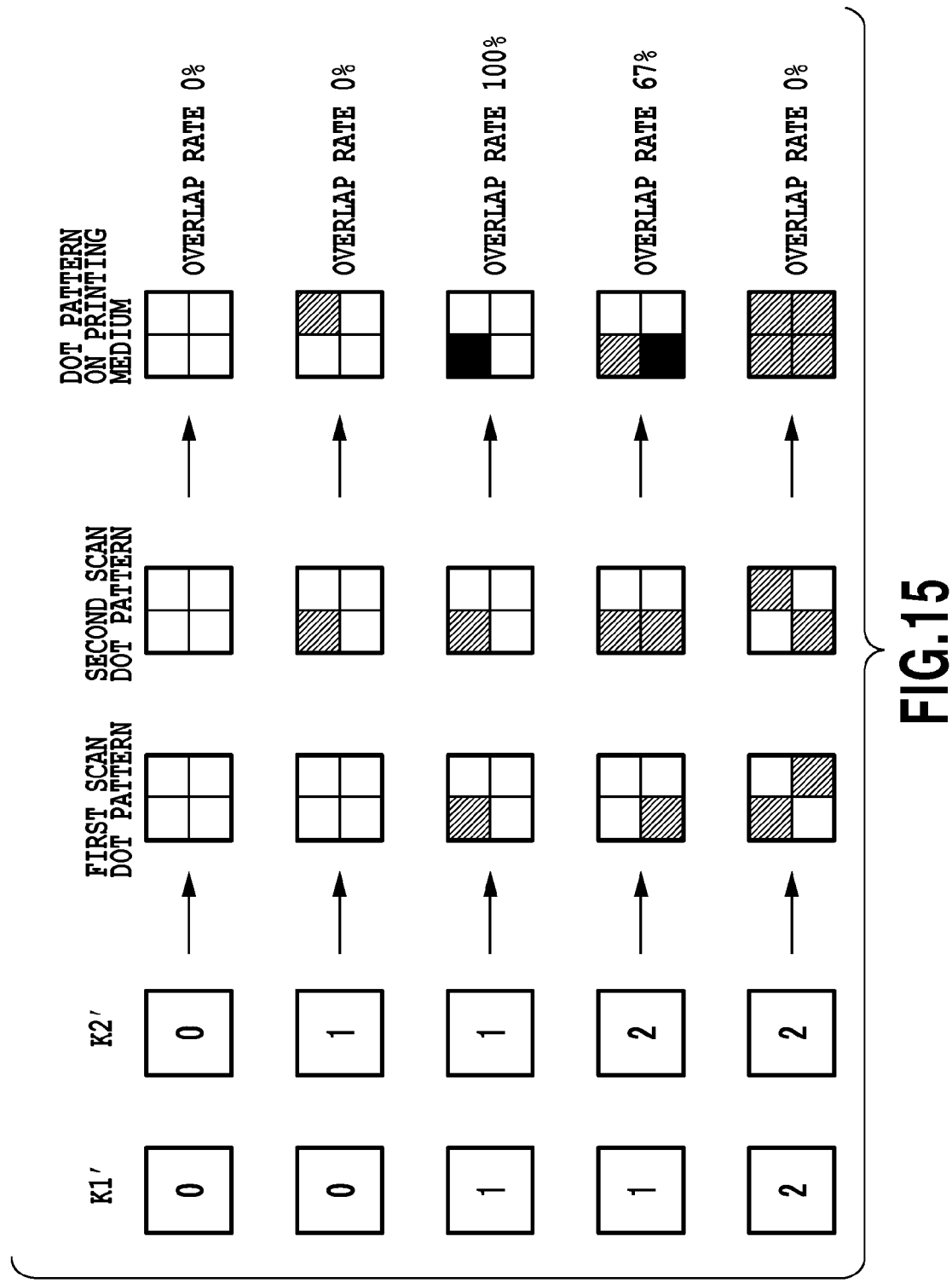
FIG. 15 is a diagram for explaining the dot overlap rate when performing index expansion processing.

FIG. 15 is a diagram for explaining an example of the index expansion process and index pattern (dot pattern). The index expansion processing unit 46 of this embodiment converts 3-value image data (K1', K2') that corresponds to 1 pixel to binary image data (dot pattern) that corresponds to 2 sub pixels×2 sub pixels. More specifically, 3-value image data K1' having a value 0 to 2 is converted to a dot pattern for the first scan. Similarly, 3-value image data K2' having a value 0 to 2 is converted to a dot pattern for a second scan. In addition, a pattern that is obtained by combining the dot pattern for the first scan and the dot pattern for the second scan (illustrated furthest on the right side in the figure, "dot pattern on the printing medium") is printed in the pixel. In regards to the dot patterns for the first and second scans, the diagonal line portions represent data (data that is "1") that indicates printing of dots in sub pixels, and white portions represent data (data that is "0") that indicates no printing of dots in sub pixels. In addition, in regards to dot patterns on the printing medium, black portions represent the printing of two dots in a sub pixel, diagonal line portions represent the printing of 1 dot in a sub pixel and white portions represent no printing of dots in a sub pixel.

Here, the case in which image processing is applied that converts 3-value or greater image data that corresponds to a pixel to a binary dot pattern that corresponds to m×n sub pixels, will be explained in terms of dot overlap rate. In this case, the "dot overlap rate" is the ratio of the number of dots, that overlap and are printed in the same sub pixel position in the pixel area by a different scan (or a different printing element group), to the total number of dots to be printed in one pixel area that comprises a plurality of sub pixels. To explain this in more detail, referring to FIG. 15, when both K' and K2' are 0, no dots are printed in either the first printing scan or second printing scan and the dot overlap rate is 0. When one of K1' and K2' is 0 and the other is 1, a dot will be printed in only one scan, so the dot overlap rate remains 0%. When both K1' and K2' are 1, two dots overlap and are printed in the upper left sub pixel of the 2 sub pixels×2 sub pixels, so the dot overlap rate is 100% (=2÷2×100). Moreover, when one is 1 and the other is 2, two dots overlap and are printed in the lower left sub pixel of the 2 sub pixels×2 sub pixels, and only one dot is printing in the upper left sub pixel, so the dot overlap rate is 67% (=2÷3×100). Furthermore, when both K1' and K2' are 2, dots do not overlap in the sub pixels so the dot overlap rate is 0%. In other words, by preparing index patterns (dot patterns) in advance that correspond 1 to 1 with each level as illustrated in FIG. 15, the dot overlap rates in the pixel area are primarily set by setting combinations of K1' and K2' in the quantization process as illustrated in FIG. 14.

Next, the relationship between the dot overlap rate and density area in this embodiment will be explained using FIG. 15. In the example in FIG. 15, it is possible to print up to a maximum of four dots in one pixel. Therefore, a printing rate of 100% is the state in which four dots are printed in one pixel. In the example in FIG. 15, when K1'=0 and K2'=0, the printing rate is 0%, when K1'=1 (or 0) and K2'=0 (or 1) the printing rate is 25%, and when K1'=1 and K2'=1, the printing rate is 50%. Moreover, when K1'=1 (or 2) and K2'=2 (or 1) the printing rate is 75%, and when K1'=2 and K2'=2, the printing rate is 100%. Furthermore, in low-density areas where the printing rate is 0% and 25%, the dot overlap rate is 0%, in medium-density areas where the printing rate is 50%, the dot overlap rate is 100%, and in high-density areas where the printing rate is 75% and 100%, the dot overlap rates are 67% and 0%, respectively. In this way, in this embodiment as well, the dot overlap rate in medium-density areas, where density unevenness is taken into consideration the most, is made to be higher than in other density areas (low-density areas, high-density areas). The calculation method and control method for the dot overlap as described above are the same even in the case where index patterns K1' to KM' are prepared for M-pass printing. These kinds of index patterns can be prepared for each image characteristic. By doing so, it is possible to adjust the dot overlap rate according to the image characteristic by using index expansion processing.

With this embodiment as explained above, density data is generated for M planes that correspond to M number of multipasses, after which the density data for M planes is quantized to multi-value data. In addition, this M number of multi-value quantized data undergoes binarization processing using an index pattern such that dot overlap rates are achieved that correspond to the image characteristics. By doing so, for example, the dot overlap rate of portrait images in which graininess is of most importance can be made to be lower than that of images other than portraits such as images of scenery. In other words, by making the dot overlap rate of images in which density unevenness stands out more than graininess different than the dot overlap rate of images for which graininess is taken into consideration more than density unevenness, it is possible to output high-quality images regardless of the image characteristic.

Embodiment 4

In the embodiments described above processing in the case of controlling the dot overlap rate of the entire image according to a parameter that is set to correspond to the image characteristic analysis result was explained. In this embodiment, a method is explained in which objects in an image are further analyzed, and the dot overlap rates of the individual objects are controlled according to the object characteristics.

It is also possible to apply the same block diagrams (FIG. 3, FIG. 17 and FIG. 19) used in the embodiments described above to this embodiment. However, this embodiment differs from the embodiments described above in that the image characteristic analysis/parameter setting unit of this embodiment does not send one parameter per entire image, but rather sets a parameter for each object in the image. In other words, a plurality of parameters is set for one image. The objects referred to here include a "person's face", "skin", "sky", "ocean", objects having detailed texture such as "mountains", "sand", cloth", objects having flat gradation such as a "balloon", "glass" or "text". These kinds of objects can be found from the methods disclosed in Japanese Patent Laid-Open No. 2005-173932, Japanese Patent Laid-Open No. 2005-063307 and Japanese Patent Laid-Open No. H05-003542 (1993).

The image characteristic analysis/parameter setting unit of this embodiment analyzes where extracted objects are located in the overall image, and stores that position and surface area together with parameters unique to the object in memory 3003. For example, where there is a plurality of faces having a surface area that is equal to or greater than a specified value, the position and surface area of each are stored in memory together with face parameters. When doing this, for background areas other than face areas, background parameters, or in other words, parameters for which the dot overlap rate has been made high, are stored in the memory 3003. An example of the case in which the object is a "face" will be explained below.

Referring to FIG. 3, when the dot overlap rate is controlled by the distribution rates of the color conversion/image data division unit 62 as in the first embodiment, the color conversion/image data division unit 62 designates different methods for the distribution of the pixel that is the object of processing depending on whether or not that pixel is in a face area. More specifically, when the pixel in question is a pixel that is specified by the memory 3003 as being in a face area, the multi-value image data is distributed with a relatively large bias of distribution rate according to distribution rates for face parameters. On the other hand, when the pixel that is the object of processing is a pixel specified as being in a background area, multi-value image data is distributed with a relatively small bias of distribution rate for background parameters. By employing this kind of construction, the dot overlap rate can be controlled by a curve as illustrated by curve 312 in FIG. 6 for an object that is determined to be a face area, and the dot overlap rate can be controlled by a curve as illustrated by curve 311 in FIG. 6 for an area that is determined to be background.

On the other hand, referencing FIG. 17, when controlling the dot overlap rate by using a threshold value table that is referenced by the quantization processing unit 25 as in the second embodiment, the quantization processing unit 25 switches the referenced threshold value table according to whether or not the pixel to be processed is a in a face area. More specifically, when the pixel in question is a pixel that is specified by the memory 3003 as being in a face area, multi-value image data is quantized by referencing a threshold value table that keeps the dot overlap rate relatively low according to a face parameter. On the other hand, when the pixel in question is a pixel that is specified as being in a background area, multi-value image data is quantized by referencing a threshold value table for which the dot overlap rate is set relatively high according to a background parameter. By employing this kind of construction, an image can be output for which the dot overlap rate for objects that are determined to be a face area can be kept low, and the dot overlap rate of areas determined to be background can be set high, even in the same image. As a result, it is possible to output a high quality image having face areas in which the graininess is suppressed, and background areas in which density unevenness is suppressed, even in the same image.

However, when the dot overlap rate changes greatly between face areas and background areas, there may be pseudo contours at these boundaries due to rapid changes in dot overlap rates. In that case, it is possible to analyze not only the position of face areas and background areas, but the position of boundary areas as well, store those areas in memory, and set the dot overlap rate at those areas such that it is greater than in face areas but less than in background areas.

Figure 13:
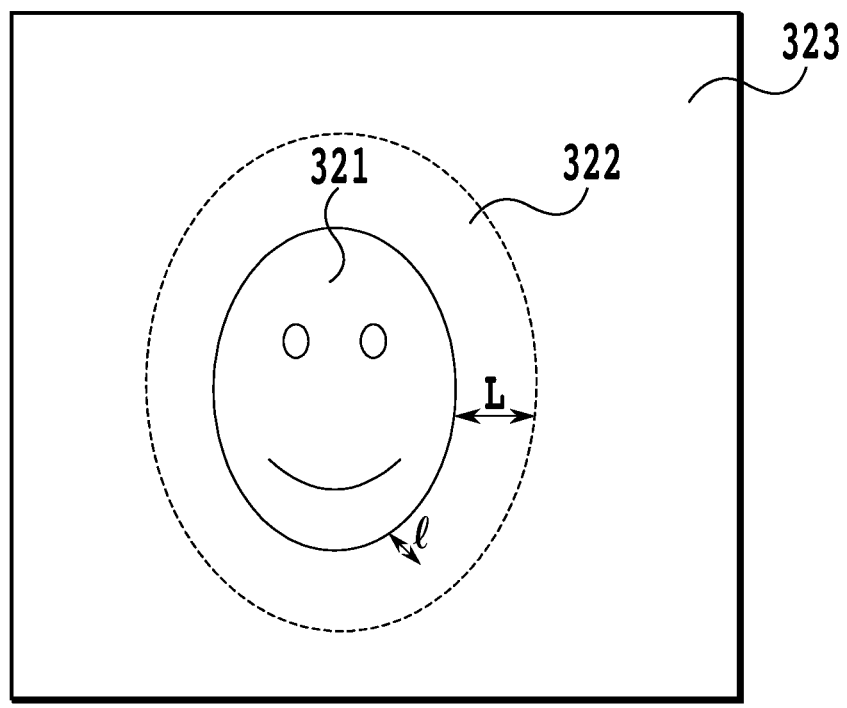
FIG. 13 is a diagram for explaining the positional relationship between a face area, background area and buffer area.

FIG. 13 is a diagram for explaining the positional relationship between face areas and background areas and the buffer areas at the boundaries between these. In FIG. 13, 321 is a face area, 323 is a background area and 322 is a buffer area. In this example, the image characteristic analysis/parameter setting unit analyzes the position of the face area 321, and then sets an area from the edge section of the face area 321 to a position separated by a specified width L as a buffer area 322. Moreover, the image characteristic analysis/parameter setting unit sets the area that is not included in either the face area 321 or buffer area 322 as a background area 323. After that, the color conversion/image data division unit and quantization processing unit use the parameters for face areas for executing processing for the face area 321, use the parameters for buffer areas for executing processing for the buffer area 322 and use parameters for background areas for executing processing for the background area 323. In doing so, an image having a relatively low dot overlap rate is printed in the face area 321, an image having a relatively high dot overlap rate is printed in the background area, and an image having a dot overlap rate that is higher than that of the face area 321 and lower than that of the background area is printed in the buffer area. It is also possible to gradually change the dot overlap rate of the buffer area according to the distance l from the face area.

Figure 20:
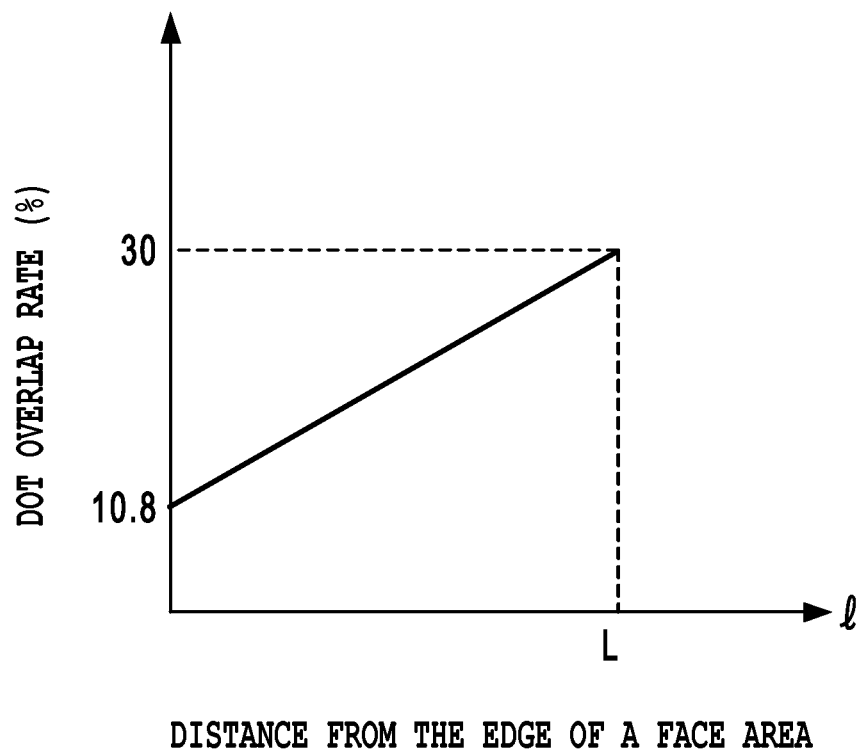
FIG. 20 is a diagram that illustrates the relationship between the position of a pixel in the buffer area and the dot overlap rate.

FIG. 20 is a diagram that illustrates the relationship between the position of pixels and the dot overlap rate in the buffer area 322. The horizontal axis is the distance from the outer perimeter of the face area 321, and the vertical axis is the dot overlap rate at a certain position at such a distance. Here, an example is given of the case in which the printing rate is 60%. At a position that comes in contact with the face area (l=0), the dot overlap rate is 10.8%, whereas at a position that comes in contact with the background area 323 (l=L), the dot overlap rate is 30%; so in the range 0<l<L, the dot overlap rate gradually increases from 10.8% to 30%. As can be seen by referencing Table 1 or FIG. 6, when adjusting this kind of dot overlap rate by the color conversion/image data division unit, the distribution rate can be gradually changed from (90:10) to (50:50) according to the distance l (0<l<L). Moreover, when adjusting the dot overlap rate by the quantization processing unit, the threshold value tables as illustrated in FIGS. 18A to 18G can changed in steps according to the distance l (0<l<L).

The control explained above is achieved by the image characteristic analysis/parameter setting unit storing in memory the distance l from the edge section of the face area 321 for pixels in the buffer area and the color conversion/image data division unit or the quantization processing unit executing processing using parameters according to the value l. In doing so, it is possible to smooth the change of the dot overlap rate in the buffer area 322 between the face area 321 and the background area 323, and thus it is possible to print a good image without the occurrence of pseudo contours.

An example was explained above of setting a buffer area on the outside of face areas, however; it is also possible to provide a buffer area inside the face area where the dot overlap gradually increases in the direction approaching the background area.

The case was explained above in which a face area was extracted as an object, however; various things such as "sky", "ocean", "mountains", "sand", "cloth", "balloon", "glass", "text" and the like could be given as example of kinds of objects. The dot overlap rates suitable to these objects differ according to the type of object and the surface area occupied within the image by the object, so a plurality of parameters can be prepared in order to obtain different dot overlap rates according to type and surface area of these objects.

For example, a method is disclosed in Japanese Patent Laid-Open No. 2005-063307 that distinguishes between text areas and photograph areas in an image. For text areas, it is desired that text be printed at a high density in order for clear text recognition. When the dot overlap rate is increased too high, the coverage rate decreases by the amount that the dots overlap, so it is feasible that insufficient density will become a problem. Therefore, in order to achieve clear text quality, it is preferred that the dot overlap rate in text areas be set low.

Incidentally, when construction as described above is employed, even in cases where the printing rate of two areas is the same for a certain color of ink, when the objects in those areas are different, the dot overlap rates of that ink color will differ in those areas.

Table 3 illustrates an example in which the color conversion/image data division unit adjusts the distribution rate in order to make the dot overlap rate different according to the object while keeping the printing rate of cyan ink equal at 50%. Here, an example is given of input image data that expresses blue sky (R=200, G=255, B=255) and input image data that expresses a dark gray background (R=50, G=50, B=50). As explained above, by employing the construction of this embodiment, even when the total ink printing rate (in other words, the number of dots of a certain ink color that are printed per unit area) is the same, the dot overlap rates can be made to be different according to objects in the area.

TABLE 3

| | Cyan ink printing rate (%) | | | |
|---|---|---|---|---|
| | First scan | Second scan | Total | Dot overlap rate |
| Blue sky color | 25 | 25 | 50 | 25 |
| Dark gray | 15 | 35 | 50 | 21 |

Other Embodiments

In the embodiments described above, a plurality of multi-value image data that correspond to a plurality of relative scans is generated based on input image data. However, it is also possible to divide input image data into a plurality of multi-value image data that corresponds to a plurality of printing element groups (nozzle arrays) and apply mask division processing between scans.

Moreover, in the embodiments described above, a method was explained in which the image characteristic analysis/parameter setting unit automatically determines the image characteristics and individual objects in an image, and prints an image using dot overlap rates that are suitable to each. However, for example, it is also possible to adjust the dot overlap rate by entering information about the user's preference, the use of the printed materials, and the like. For example, by the user selecting an object in the original image to pay attention to, it is possible to set a dot overlap rate that will suppress image defects that easily stand out in that object. By doing so, even when the object in question is located in a small amount of area on the edge of the image, it is possible to output an image in which density unevenness or graininess do not stand out in the object.

Furthermore, in the printing head of the first thru fourth embodiments, two nozzle arrays are provided for discharging ink of the same color, however; it is also possible for the number of nozzle arrays for discharging ink of the same color to be N (N is an integer 1 or greater) such as 1, 4 and 8. When performing M-pass printing with N number of nozzle arrays, first M groups of multi-value density data that correspond to M number of relative movements (scans) are generated from the inputted image data (RGB). Next, these M groups of multi-value data are quantized to generate M groups of quantized data that corresponds to M number of relative movements. After that, when N is 1, data division is not performed using a mask and the image is printed in the same area by one nozzle array during M number of relative movements. On the other hand, when N is 2 or more, the M groups of quantized data that correspond to M number or relative movements are divided into N divisions by N number of masks having a complementary relationship with each other, and quantized data for M number of relative movements that corresponds to N number of nozzle arrays is generated. Then an image is printed in the same area during M number of relative movements by N number of nozzle arrays. Even when the combinations of N number of arrays and M number of movements differ for each image characteristic, by employing or combining the embodiments described above it is possible to achieve dot overlap rates that are suitable for each individual printing mode.

In the explanation above, for M-pass printing, the case of generating M groups of multi-value density data (M sets of CMYK data) that correspond to M number of relative movements from input image data (RGB) was explained, however; the present invention is not limited to this. In M-pass printing mode (M is 3 or greater), it is not necessary to generate M groups of density data, and it is possible to generate P groups (P is an integer 2 or greater) of density data where P is less than M, and then obtain P groups of quantized data by quantizing the P groups of density data. After that, M groups of quantized data for M number of passes are obtained by dividing at least one group of the P groups of quantized data. When doing this, the effect of the present invention can be obtained by preparing distribution rates, which are used when generating P number of density data, or threshold value tables, which are used when quantizing the P number of density data, so that dot overlap rates that are suitable for the image characteristics can be obtained.

Furthermore, the multipass printing method described above can be applied to a full-line type printer that comprises a number of printing elements that corresponds to the width of the printing medium, with N number of printing heads that discharge the same amount of the same color of ink being arranged in the conveying direction of the printing medium. In this case, image data can be divided into image data to be printed by N number of printing heads that discharge the same kind of ink, and the divided image data can be printed by each of the N number of printing heads while the printing medium is being conveyed (during relative movement). As a result, even though fluctuation may occur in the discharge characteristics of each of the individual printing elements, it is possible to reduce the effect of that fluctuation between the N number of printing elements. Moreover, even though fluctuation in head arrangement or discharge speed exists between the N number of printing heads, the density unevenness or graininess that occurs due to deviation of dot groups that are printed by each of the printing heads, or in other words, deviation between planes, can be controlled the same as in the embodiments described above.

That is, in the present invention, first density data that corresponds to at least one relative movement and second density data that corresponds to at least one other relative movement can be generated from input image data. The M-pass data generation process explained here can be applied to an N printing element group data generation process, as is made clear in the explanation above. In other words, even when using N number of printing element groups that discharge ink of the same color, it is possible to generate P groups of density data where P is fewer than N, or it is also possible to generate N groups of density data.

In the embodiments described above, an image processor that executes the characteristic image processing of the present invention was explained using as an example a printer that comprises a control unit 3000 having an image processing function, however; the present invention is not limited to this kind of construction. The characteristic image processing of the present invention could also be executed by a host device (for example, the PC 3010 in FIG. 2) in which a printer driver is installed. In this case, the host device corresponds to the image processor of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-237909, filed Oct. 14, 2009, which is hereby incorporated by reference herein in its entirety.

What is claimed is:

1. An image processor for processing input image data of an image to be printed on a unit area which corresponds to a plurality of dots on a printing medium in order to print in the unit area by a plurality of relative movements, including a first relative movement and a second relative movement which is different to the first relative movement, between a printing unit that prints the dots and the printing medium, comprising:
    an obtaining unit configured to obtain information about an image characteristic of the image from the input image data;
    a generation unit configured to perform a generation process for generating from the input image data at least first multi-value density data that corresponds to the first relative movement excluding the second relative movement, and second multi-value density data that corresponds to the second relative movement excluding the first relative movement; and
    a quantization unit configured to perform a quantization process on each of the first multi-value density data and the second multi-value density data to generate each of a first quantized data which is used for printing in the first relative movement and a second quantized data which is used for printing in the second relative movement, wherein the generation unit performs the generation process or the quantization unit performs the quantization process, based on the information about the image characteristic of the image obtained by the obtaining unit so that a ratio in a case that the obtaining unit obtains an information about a first image characteristic is lower than the ratio in a case that the obtaining unit obtains an information about a second image characteristic which is different to the first image characteristic, the ratio being a ratio of the number of dots that are printed in a same position in the unit area by both of the first and second relative movements on the basis of the first and second quantized data to the total number of dots that are printed in the unit area by the first and second relative movements on the basis of the first and second quantized data.

2. The image processor according to claim 1, wherein the obtaining unit obtains a plurality of information about image characteristics of the input image data with respect to each of a plurality of objects included in the input image data, and wherein the generation unit performs the generation process or the quantization unit performs the quantization process, so that the ratio corresponding to an object in which the obtaining unit obtains the information about the first image characteristic is lower than the ratio to an object in which the obtaining unit obtains the information about the second image characteristic, with respect to each of the plurality of objects.

3. The image processor according to claim 1, wherein the quantization unit performs quantization processing of the second multi-value density data based on the first multi-value density data, and performs quantization processing of the first multi-value density data based on the second multi-value density data so that the ratio in a case that the obtaining unit obtains the information about the first image characteristic is lower than the ratio in a case that the obtaining unit obtains the information about the second image characteristic.

4. The image processor according to claim 3, wherein the quantization process is an error-diffusion process, and the quantization unit sets a threshold value to be used in a case that performing error-diffusion processing of the first multi-value density data based on the second multi-value density data and performs error-diffusion processing of the first multi-value density data based on the set threshold value, and sets a threshold value to be used in a case that performing error-diffusion processing of the second multi-value density data based on the first multi-value density data and performs error-diffusion processing of the second multi-value density data based on the set threshold value.

5. The image processor according to claim 3, wherein the quantization unit comprises:

(i) a unit configured to perform an L-value (L is an integer 3 or greater) quantization process and generate first L-value quantized data that corresponds to the first multi-value density data and a second L-value quantized data that corresponds to the second multi-value density data; and (ii) a unit configured to convert each of the first and second L-value quantized data to each of first and second binary quantized data using dot patterns so that the ratio in a case that the obtaining unit obtains the information about the first image characteristic is lower than the ratio in a case that the obtaining unit obtains the information about the second image characteristic.

6. The image processor according to claim 1, wherein the first image characteristic is a portrait image, and the second characteristic is other than the portrait image.

7. The image processor according to claim 1, wherein the generation unit generates the first and second multi-value density data from the input image data so that a difference in a case that the density represented by the input image data is a first density is smaller than both of the difference in a case that the density represented by the input image data is a second density which is lower than the first density and the difference in a case that the density represented by the input image data is a third density which is higher than the first density, the difference being a difference between a value of the first multi-value density data and a value of the second multi-value density data.

8. The image processor according to claim 7, wherein the generation unit generates the first and second multi-value density data from the input image data so that the difference in a case that the obtaining unit obtains an information about a first image characteristic and the density represented by the input image data is the first density is higher than the difference in a case that the obtaining unit obtains an information about a second image characteristic and the density represented by the input image data is the first density.

9. The image processor according to claim 1, wherein the first characteristic is an image of person, and the second characteristic is an image of scenery.

10. An image processor for processing input image data of an image to be printed on a unit area which corresponds to a plurality of dots on a printing medium in order to print in the unit area by relative movement between a printing unit in which a plurality of printing element groups, including a first printing element group and a second printing element group which is different to the first printing element group, that print dots of the same color are arranged and the printing medium, comprising:

an obtaining unit configured to obtain information about an image characteristic of the image from the input image data;

a generation unit configured to perform a generation process for generating from the input image data at least first multi-value density data that corresponds to the first printing element group excluding the second printing element group, and second multi-value density data that corresponds to the second printing element group excluding the first printing element group; and a quantization unit configured to perform a quantization process on each of the first multi-value density data and the second multi-value density data to generate each of first quantized data which is used for printing from the first printing element group and second quantized data which is used for printing from the second printing element group, wherein the generation unit performs the generation process or the quantization unit performs the quantization process, based on the information about the image characteristic of the image obtained by the obtaining unit so that a ratio in a case that the obtaining unit obtains an information about a first image characteristic is lower than the ratio in a case that the obtaining unit obtains an information about a second image characteristic which is different to the first image characteristic, the ratio being a ratio of the number of dots that are printed in a same position in the unit area by both of the first and second printing element groups on the basis of the first and second quantized data to the total number of dots that are printed in the unit area by the first and second printing element groups on the basis of the first and second quantized data.

11. An image processing method for processing input image data of an image to be printed on a unit area which corresponds to a plurality of dots on a printing medium in order to print in the unit area by a plurality of relative movements, including a first relative movement and a second relative movement which is different to the first relative movement, between a printing unit that prints the dots and the printing medium, the method comprising the steps of:

performing an obtaining process of obtaining information about an image characteristic of the input image data;

performing a generation process of generating from the input image data at least first multi-value density data that corresponds to the first relative movements excluding the second relative movement, and second multi-value density data that corresponds to the second relative movement excluding the first relative movement; and performing a quantization process on each of the first multi-value density data and the second multi-value density data to generate each of a first quantized data which is used for printing in the first relative movement and a second quantized data which is used for printing in the second relative movement, wherein at least one of the generation process or the quantization process is performed based on the information about image characteristic of the image obtained by the obtaining step so that a ratio in a case that the obtaining step obtains an information about a first image characteristic is lower than the ratio in a case that the obtaining step obtains an information about a second image characteristic which is different to the first image characteristic, the ratio being a ratio of the number of dots that are printed in a same position in the unit area by both of the first and second relative movements on the basis of the first and second quantized data to the total number of dots that are printed in the unit area by the first and second relative movements on the basis of the first and second quantized data.

12. An image processing method for processing input image data of an image to be printed on a unit area which corresponds to a plurality of dots on a printing medium in order to print in the unit area by relative movement between a printing unit in which a plurality of printing element groups, including a first printing element group and a second printing element group which is different to the first printing element group, that print dots of the same color are arranged and the printing medium, the method comprising the steps of:

performing an obtaining process of obtaining information about an image characteristic of the input image data;

performing a generation process of generating from the input image data at least first multi-value density data that corresponds to the first printing element group excluding the second printing element group, and second multi-value density data that corresponds to the second printing element group excluding the first printing element group; and performing a quantization process on each of the first multi-value density data and the second multi-value density data to generate each of a first quantized data which is used for printing from the first printing element group and a second quantized data which is used for printing from the second printing element group, wherein at least one of the generation process or the quantization process is performed based on the information about image characteristic of the image obtained by the obtaining step so that a ratio in a case that the obtaining step obtains an information about a first image characteristic is lower than the ratio in a case that the obtaining step obtains an information about a second image characteristic which is different to the first image characteristic, the ratio being a ratio of the number of dots that are printed in a same position in the unit area by both of the first and second printing element groups on the basis of the first and second quantized data to the total number of dots that are printed in the unit area by the first and second printing element groups on the basis of the first and second quantized data.

* * * * *